US012654046B2

(12) United States Patent
Rodriguez

(10) Patent No.: US 12,654,046 B2
(45) Date of Patent: Jun. 16, 2026

(54) SETTABLE LENGTH FALL ARREST DEVICE

(71) Applicant: Latchways plc, Wiltshire (GB)

(72) Inventor: Maria Rodriguez, Chippenham (GB)

(73) Assignee: MSA Technology, LLC, Cranberry Township, PA (US)

( * ) Notice: Subject to any disclaimer, the term of this patent is extended or adjusted under 35 U.S.C. 154(b) by 1013 days.

(21) Appl. No.: 17/776,625

(22) PCT Filed: Nov. 11, 2020

(86) PCT No.: PCT/GB2020/052856

§ 371 (c)(1),
(2) Date: May 13, 2022

(87) PCT Pub. No.: WO2021/094737

PCT Pub. Date: May 20, 2021

(65) Prior Publication Data

US 2022/0401765 A1 Dec. 22, 2022

(30) Foreign Application Priority Data

Nov. 14, 2019 (GB) ..................................... 1916588
Jan. 9, 2020 (GB) ..................................... 2000291

(51) Int. Cl.
*A62B 35/00* (2006.01)

(52) U.S. Cl.
CPC ................................ *A62B 35/0093* (2013.01)

(58) Field of Classification Search
CPC ...... A62B 35/0093; A62B 35/00; E04G 21/32
See application file for complete search history.

(56) References Cited

U.S. PATENT DOCUMENTS

| | | | |
|---|---|---|---|
| 2,089,031 | A | 8/1937 | MacDonald |
| 2,452,524 | A | 10/1948 | Metten |
| 2,791,397 | A | 5/1957 | Coffman |
| 4,416,430 | A | 11/1983 | Totten |
| 4,602,699 | A | 7/1986 | Matt |
| 5,771,993 | A | 6/1998 | Anderson |
| 6,092,623 | A | 7/2000 | Collavino |

(Continued)

FOREIGN PATENT DOCUMENTS

| | | |
|---|---|---|
| CN | 203944051 | 11/2014 |
| CN | 204601426 | 9/2015 |

(Continued)

OTHER PUBLICATIONS

CNIPA, Appl. 202080092781.5, Office Action, Sep. 22, 2023.

(Continued)

*Primary Examiner* — Eret C McNichols
(74) *Attorney, Agent, or Firm* — Jones Day

(57) ABSTRACT

A fall arrest device (10) includes a drum (1) configured to have a safety line (2) wound thereon, a speed responsive engagement assembly (3, 4, 6) arranged to inhibit rotation of the drum (1) above a predetermined rotational speed, and a traveller (30) configured to move in response to rotation of the drum (1). The traveller (30) is configured to activate the speed responsive engagement assembly (3, 4, 6) when a predetermined length of safety line has been paid out. This allows a user to be restrained from the edge of a worksite or other location where a fall may occur.

18 Claims, 15 Drawing Sheets

(56) References Cited

U.S. PATENT DOCUMENTS 6,804,830 B2 10/2004 Reynolds et al.
7,237,650 B2 7/2007 Casebolt
7,744,063 B2 6/2010 Jones
7,815,013 B2 10/2010 Griffith
7,870,934 B2 1/2011 Ecker
7,896,281 B2 3/2011 Bleshoy
7,946,387 B2 5/2011 Betcher et al.
8,181,744 B2 5/2012 Parker et al.
8,191,815 B2 6/2012 Huang
8,226,024 B2 7/2012 Meillet
8,292,028 B2 10/2012 Wise
8,430,206 B2 4/2013 Griffiths et al.
8,430,207 B2 4/2013 Griffiths et al.
8,490,750 B2 7/2013 Balquist et al.
8,511,434 B2 8/2013 Blomberg
8,528,694 B2 9/2013 Meillet et al.
8,550,225 B2 10/2013 Blomberg et al.
8,567,562 B2 10/2013 Meillet et al.
8,701,833 B2 4/2014 Marquardt et al.
8,739,929 B2 6/2014 Meillet et al.
8,757,532 B2 6/2014 Votel et al.
8,800,715 B2 8/2014 Olson et al.
8,800,719 B2 8/2014 Auston et al.
8,893,854 B2 11/2014 Casebolt
8,925,687 B2 1/2015 Meillet et al.
8,931,593 B2 1/2015 Harris, Jr.
8,950,551 B2 2/2015 Jones et al.
8,991,556 B2 3/2015 Auston et al.
9,121,462 B2 9/2015 Casebolt
9,199,103 B2 12/2015 Hetrich et al.
9,205,285 B2 12/2015 Jones et al.
9,242,128 B2 1/2016 Macy
9,283,412 B2 3/2016 Myer
9,320,925 B2 4/2016 Wise
9,480,865 B2 11/2016 Naylor et al.
9,498,660 B2 11/2016 Moine et al.
9,643,034 B2 5/2017 Wise
9,670,980 B2 6/2017 Jones et al.
9,827,451 B2 11/2017 Renton et al.
9,913,999 B2 3/2018 Balquist et al.
9,943,071 B2 * 4/2018 Hill .................... B65H 75/4426
10,016,638 B2 7/2018 Casebolt et al.
10,022,573 B2 7/2018 Jones et al.
10,029,128 B2 7/2018 Lin
10,072,689 B2 9/2018 Parker et al.
10,125,837 B1 11/2018 Fegley et al.
10,149,991 B2 12/2018 Schurian et al.
10,159,859 B2 12/2018 Wu
10,207,128 B2 2/2019 Hetrich
10,279,205 B2 5/2019 Hung
10,322,305 B2 6/2019 Balquist et al.
10,322,306 B2 6/2019 Jones et al.
10,343,001 B2 7/2019 Seman
10,384,083 B2 8/2019 Bell
10,413,761 B2 9/2019 Hetrich
10,456,609 B2 10/2019 Yang et al.
10,478,646 B2 11/2019 Sun
10,498,210 B2 12/2019 Diehl et al.
10,512,802 B2 12/2019 Patton et al.
10,532,234 B2 1/2020 Hsu
10,537,758 B2 1/2020 Comet
10,556,138 B2 2/2020 Fegley et al.
10,576,310 B2 3/2020 Hung
10,653,903 B2 5/2020 Jones et al.
10,661,103 B2 5/2020 Griffiths et al.
10,661,106 B2 5/2020 Choate et al.
10,688,323 B2 6/2020 Wolner et al.
10,695,595 B2 6/2020 Grant
10,702,723 B2 7/2020 Quigley et al.
10,744,354 B2 8/2020 Choate et al.
10,760,336 B2 9/2020 Hwang
10,760,626 B2 9/2020 Aono et al.
10,765,895 B2 9/2020 Wang et al.
10,774,885 B2 9/2020 Cornelius
10,792,520 B2 10/2020 Boraas et al.
10,792,523 B2 10/2020 Casebolt
10,799,731 B2 10/2020 Jacob et al.
10,814,149 B2 10/2020 Liggett et al.
10,816,054 B2 10/2020 Patton et al.
10,828,516 B2 11/2020 Chabod
10,864,393 B2 12/2020 Burke
10,874,886 B2 12/2020 Bertoti et al.
10,960,243 B2 3/2021 Chen et al.
10,981,760 B2 4/2021 Farkash et al.
10,987,528 B2 4/2021 Wang et al.
11,000,716 B2 5/2021 Huseth et al.
11,009,089 B2 5/2021 Allington et al.
11,033,003 B1 6/2021 Burkhardt
11,047,431 B2 6/2021 Burke
11,090,517 B2 8/2021 Hung et al.
11,255,060 B2 2/2022 Lanter
11,286,143 B2 3/2022 Lepoutre et al.
11,300,166 B2 4/2022 Dohi et al.
11,428,278 B2 8/2022 Daikoku et al.
11,486,458 B2 11/2022 Watanabe et al.
11,504,557 B2 11/2022 Boraas et al.
11,629,768 B2 4/2023 Dohi et al.
11,633,632 B2 4/2023 Carlson et al.
2003/0145803 A1 8/2003 Muller
2004/0262080 A1 12/2004 Reynolds et al.
2005/0217937 A1 10/2005 Rohlf
2006/0021825 A1 2/2006 An et al.
2006/0163000 A1 7/2006 Chowthi
2007/0068731 A1 3/2007 Griffith
2007/0157892 A1 7/2007 Farrell et al.
2008/0011895 A1 1/2008 Bleshoy
2008/0257278 A1 10/2008 Simpson et al.
2009/0078505 A1 3/2009 Casebolt et al.
2009/0178887 A1 7/2009 Reeves et al.
2009/0260922 A1 10/2009 Marquardt et al.
2010/0116922 A1 5/2010 Choate et al.
2010/0236867 A1 9/2010 Jones et al.
2011/0059325 A1 3/2011 Juan et al.
2011/0158632 A1 6/2011 Ono
2011/0315482 A1 12/2011 Griffiths et al.
2011/0315483 A1 12/2011 Griffiths et al.
2012/0024640 A1 2/2012 Argoud
2012/0103724 A1 5/2012 Reynolds et al.
2012/0205478 A1 8/2012 Balquist et al.
2013/0008392 A1 1/2013 Holmstrom
2013/0020149 A1 1/2013 Wise
2013/0056302 A1 3/2013 Bishop
2013/0105246 A1 5/2013 Schlangen et al.
2013/0105247 A1 5/2013 Casebolt
2013/0200197 A1 8/2013 Bogdahn et al.
2013/0233648 A1 9/2013 Smit
2013/0292219 A1 11/2013 Perner
2014/0190770 A1 7/2014 Renton et al.
2015/0231424 A1 8/2015 Kim
2016/0338323 A1 11/2016 Nishida
2016/0367844 A1 12/2016 Yang
2017/0142935 A1 5/2017 Max et al.
2017/0295755 A1 10/2017 Hill
2017/0368386 A1 12/2017 Wu
2017/0368387 A1 12/2017 Fife et al.
2018/0015312 A1 1/2018 Jones et al.
2018/0107169 A1 4/2018 Hu et al.
2018/0161608 A1 6/2018 Choate et al.
2018/0178044 A1 6/2018 Hetrich
2018/0289987 A1 10/2018 Hung
2018/0333596 A1 11/2018 Kils et al.
2018/0333598 A1 11/2018 Hung
2018/0345049 A1 12/2018 Hung et al.
2019/0030381 A1 1/2019 Hung
2019/0070444 A1 3/2019 Seman
2019/0076679 A1 3/2019 Auston et al.
2019/0083826 A1 3/2019 Sun
2019/0126079 A1 5/2019 Svoboda et al.
2019/0134438 A1 5/2019 Liggett et al.
2019/0143159 A1 5/2019 Grant
2019/0160310 A1 5/2019 Thompson
2019/0209877 A1 7/2019 Farrell
2019/0217134 A1 7/2019 Green Mullins
2019/0247683 A1 8/2019 Farrell

(56) References Cited

U.S. PATENT DOCUMENTS

| | | | |
|---|---|---|---|
| 2019/0275356 A1 | 9/2019 | Jones et al. | |
| 2019/0308041 A1 | 10/2019 | Harding et al. | |
| 2019/0314656 A1 | 10/2019 | Farrell et al. | |
| 2019/0321665 A1 | 10/2019 | Huseth et al. | |
| 2020/0023211 A1 | 1/2020 | Chang | |
| 2020/0047006 A1 | 2/2020 | Blackford et al. | |
| 2020/0078617 A1 | 3/2020 | Wang | |
| 2020/0078619 A1 | 3/2020 | Wang et al. | |
| 2020/0078621 A1 | 3/2020 | Chen et al. | |
| 2020/0108283 A1 | 4/2020 | Auston | |
| 2020/0124115 A1 | 4/2020 | Hand et al. | |
| 2020/0129791 A1 | 4/2020 | McMaster et al. | |
| 2020/0129792 A1 | 4/2020 | Fegley et al. | |
| 2020/0206550 A1 | 7/2020 | Blackford et al. | |
| 2020/0222732 A1 | 7/2020 | Rutkowski et al. | |
| 2020/0276462 A1 | 9/2020 | Bornack | |
| 2020/0316447 A9 | 10/2020 | Allington et al. | |
| 2020/0330800 A1 | 10/2020 | Pan | |
| 2020/0347675 A1 | 11/2020 | Knickrehm et al. | |
| 2020/0353298 A1 | 11/2020 | Casebolt | |
| 2020/0360740 A1 | 11/2020 | Jones et al. | |
| 2020/0361743 A1 | 11/2020 | Casteñeda | |
| 2020/0376342 A1 | 12/2020 | Mumford | |
| 2020/0406072 A1 | 12/2020 | Monahan et al. | |
| 2020/0406073 A1 | 12/2020 | Liao et al. | |
| 2020/0406074 A1 | 12/2020 | Fjelldal | |
| 2021/0069052 A1 | 3/2021 | Burke | |
| 2021/0077840 A1 | 3/2021 | Boraas et al. | |
| 2021/0086002 A1 | 3/2021 | Bailey et al. | |
| 2021/0088087 A1 | 3/2021 | Burke et al. | |
| 2021/0091633 A1 | 3/2021 | Diehl et al. | |
| 2021/0113865 A1 | 4/2021 | Thompson | |
| 2021/0138288 A1 | 5/2021 | Swarte | |
| 2021/0308502 A1 | 10/2021 | Blackford et al. | |
| 2022/0105374 A1 | 4/2022 | Jacob et al. | |
| 2022/0161071 A1 | 5/2022 | Hung et al. | |
| 2022/0161072 A1 | 5/2022 | Hung et al. | |
| 2022/0161073 A1 | 5/2022 | Thompson | |
| 2022/0176173 A1 | 6/2022 | Lopez | |
| 2022/0203143 A1 | 6/2022 | Blackford et al. | |
| 2022/0212906 A1 | 7/2022 | Massicotte | |
| 2022/0233891 A1 | 7/2022 | Nieuwenhuis et al. | |
| 2022/0234868 A1 | 7/2022 | Feng | |
| 2022/0249888 A1 | 8/2022 | Pollard et al. | |
| 2022/0266075 A1 | 8/2022 | Lepp et al. | |
| 2022/0273972 A1 | 9/2022 | Hung et al. | |
| 2022/0339477 A1 | 10/2022 | Tushaus | |
| 2022/0355134 A1 | 11/2022 | McLeod et al. | |
| 2022/0362592 A1 | 11/2022 | Clark et al. | |
| 2022/0362594 A1 | 11/2022 | Coyle et al. | |
| 2022/0401765 A1 | 12/2022 | Rodriguez | |
| 2024/0285986 A1* | 8/2024 | Goodspeed | A62B 35/0025 |
| 2025/0090878 A1* | 3/2025 | Audelo | A62B 35/0093 |

FOREIGN PATENT DOCUMENTS

| | | | |
|---|---|---|---|
| CN | 107569792 | | 1/2018 |
| CN | 207071172 | | 3/2018 |
| CN | 207185606 | | 4/2018 |
| CN | 207370992 | | 5/2018 |
| CN | 108721800 | | 11/2018 |
| CN | 109550168 | | 4/2019 |
| CN | 109568823 | | 4/2019 |
| CN | 109701176 | | 5/2019 |
| CN | 209221365 | | 8/2019 |
| CN | 209253979 | | 8/2019 |
| CN | 110290839 | A | 9/2019 |
| CN | 209464511 | | 10/2019 |
| CN | 209529938 | | 10/2019 |
| CN | 110439885 | | 11/2019 |
| CN | 209564532 | | 11/2019 |
| CN | 209575555 | | 11/2019 |
| CN | 110538395 | | 12/2019 |
| CN | 209714048 | | 12/2019 |
| CN | 209714051 | | 12/2019 |
| CN | 209799441 | | 12/2019 |
| CN | 210002930 | | 1/2020 |
| CN | 210020908 | | 2/2020 |
| CN | 210205654 | | 3/2020 |
| CN | 210331417 | | 4/2020 |
| CN | 210331421 | | 4/2020 |
| CN | 111110271 | | 5/2020 |
| CN | 210472829 | | 5/2020 |
| CN | 210472831 | | 5/2020 |
| CN | 210644887 | | 6/2020 |
| CN | 210698552 | | 6/2020 |
| CN | 210786035 | | 6/2020 |
| CN | 210786041 | | 6/2020 |
| CN | 210813594 | | 6/2020 |
| CN | 210813598 | | 6/2020 |
| CN | 111388903 | | 7/2020 |
| CN | 111422296 | | 7/2020 |
| CN | 210813599 | | 7/2020 |
| CN | 210992702 | | 7/2020 |
| CN | 211132771 | | 7/2020 |
| CN | 111483935 | | 8/2020 |
| CN | 211301831 | | 8/2020 |
| CN | 211357501 | | 8/2020 |
| CN | 211357502 | | 8/2020 |
| CN | 211357505 | | 8/2020 |
| CN | 211357512 | | 8/2020 |
| CN | 211434819 | | 9/2020 |
| CN | 211513192 | | 9/2020 |
| CN | 211611381 | | 10/2020 |
| CN | 211644444 | | 10/2020 |
| CN | 211675954 | | 10/2020 |
| CN | 211675955 | | 10/2020 |
| CN | 211675957 | | 10/2020 |
| CN | 211751942 | | 10/2020 |
| CN | 211798367 | | 10/2020 |
| CN | 111888673 | | 11/2020 |
| CN | 111921120 | | 11/2020 |
| CN | 111921122 | | 11/2020 |
| CN | 111927900 | | 11/2020 |
| CN | 111939496 | | 11/2020 |
| CN | 111956966 | | 11/2020 |
| CN | 111956967 | | 11/2020 |
| CN | 212016494 | | 11/2020 |
| CN | 212220487 | | 12/2020 |
| CN | 112169209 | | 1/2021 |
| CN | 112283266 | | 1/2021 |
| CN | 212327235 | | 1/2021 |
| CN | 212347492 | | 1/2021 |
| CN | 112354099 | | 2/2021 |
| CN | 212509278 | | 2/2021 |
| CN | 212522778 | | 2/2021 |
| CZ | 2244790 | | 10/2020 |
| CZ | 2653195 | | 1/2021 |
| DE | 10146039 | A1 | 4/2003 |
| DE | 2020-15103288 | | 7/2015 |
| EP | 1948324 | | 12/2010 |
| EP | 2687268 | | 1/2014 |
| EP | 3002044 | | 4/2016 |
| EP | 3550176 | | 10/2019 |
| EP | 3574958 | | 12/2019 |
| EP | 3797836 | | 3/2021 |
| EP | 3797839 | | 3/2021 |
| FR | 2259211 | * | 8/1975 |
| FR | 2259211 | A1 | 8/1975 |
| FR | 3057170 | | 4/2018 |
| GB | 1463589 | | 2/1977 |
| GB | 2481403 | | 12/2011 |
| GB | 2561849 | | 10/2018 |
| GB | 2585595 | | 1/2021 |
| JP | 6554684 | | 8/2019 |
| JP | 6625958 | | 12/2019 |
| JP | 6628713 | | 1/2020 |
| JP | 6808518 | | 1/2021 |
| KR | 102112296 | | 5/2020 |
| KR | 102159741 | | 9/2020 |
| KR | 102233281 | | 3/2021 |
| NZ | 758776 | | 5/2020 |
| TW | M360706 | | 7/2009 |
| TW | M390152 | | 10/2010 |

(56) References Cited

FOREIGN PATENT DOCUMENTS

| | | |
|---|---|---|
| TW | M421128 | 1/2012 |
| TW | M512643 | 11/2015 |
| TW | M544337 | 7/2017 |
| TW | M554490 | 1/2018 |
| TW | 201902538 | 1/2019 |
| TW | M572764 | 1/2019 |
| TW | M572765 | 1/2019 |
| TW | M572766 | 1/2019 |
| TW | M572767 | 1/2019 |
| TW | M572768 | 1/2019 |
| TW | I674125 | 10/2019 |
| TW | M586154 | 11/2019 |
| TW | M595518 | 5/2020 |
| TW | M598696 | 7/2020 |
| TW | M607551 | 2/2021 |
| WO | WO 2004/067095 | 8/2004 |
| WO | 2005/110546 | 11/2005 |
| WO | WO 2010/081202 | 7/2010 |
| WO | WO 2013/061088 | 5/2013 |
| WO | WO 2016/120614 | 8/2016 |
| WO | WO 2017/072435 | 5/2017 |
| WO | WO 2017/072437 | 5/2017 |
| WO | WO 2017/078669 | 5/2017 |
| WO | WO 2018/056852 | 3/2018 |
| WO | 2018125605 A1 | 7/2018 |
| WO | WO 2018/201254 | 11/2018 |
| WO | WO 2019/175543 | 9/2019 |
| WO | WO 2020/093579 | 5/2020 |
| WO | WO 2020/151713 | 7/2020 |
| WO | WO 2020/151715 | 7/2020 |
| WO | WO 2020/160665 | 8/2020 |
| WO | WO 2020/201700 | 10/2020 |
| WO | WO 2021/003997 | 1/2021 |
| WO | WO 2021/011789 | 1/2021 |
| WO | WO 2021/044163 | 3/2021 |
| WO | WO 2021/054480 | 3/2021 |
| WO | WO 2021/084383 | 5/2021 |
| WO | WO 2022/003500 | 1/2022 |
| WO | WO 2022/003501 | 1/2022 |
| WO | WO 2022/009175 | 1/2022 |

OTHER PUBLICATIONS

Patent Cooperation Treaty, PCT/GB2020/052856, International Search Report and Written Opinion mailed Feb. 1, 2021.

UK Intellectual Property Office, Appl. GB1916588.5, Examination Report, May 22, 2023.

Brazilian PTO, Appl. BR 1120220094108, Preliminary Office Action, Jun. 15, 2025.

* cited by examiner

SETTABLE LENGTH FALL ARREST DEVICE

CROSS-REFERENCE TO RELATED APPLICATION

This application is a U.S. National Stage Application under 35 U.S.C. § 371 of International Patent Application No. PCT/GB2020/052856, filed Nov. 11, 2020, which claims priority to United Kingdom Patent Application No. 1916588.5 filed Nov. 14, 2019 and to United Kingdom Patent Application No. 2000291.1 filed 9 Jan. 2020, the disclosures of which are incorporated by reference herein in their entireties.

BACKGROUND

Technical Field

The present disclosure is directed towards an apparatus for use in a fall arrest or fall protection device for setting or restricting the maximum length of safety line that can be paid out of the device.

Technical Considerations

Fall arrest devices are used to prevent personnel working at height from suffering injury as a result of falling. Fall arrest devices are often referred to as height safety systems or fall protection devices. Fall arrest devices typically include: a drum upon which a safety line or lifeline is wound and a speed responsive mechanism arranged to inhibit the drum rotation above a predetermined rotational speed.

The fall arrest device may include an energy absorber device or ring arranged to be activated if a load above a predetermined threshold is deployed when the speed responsive mechanism is activated. Alternatively, an external energy absorber device may be provided, which is usually connected between the safety line and the user. For example, the energy absorber device may be connected to a harness worn by a user.

The energy absorber device absorbs the energy, or shock of a fall arrest event. If an energy absorber device is not used as part of a fall arrest system, a user can continue to descend even after engagement of other safety arrangements, such as a speed responsive brake, due to the loading force of the user's weight acting on the safety line. This continued descent is prevented or limited by an energy absorber device.

A self-retracting lifeline (SRL) is a type of fall arrest device which includes a rewinding mechanism configured to automatically pay out and retract the lifeline as necessary to allow the user movement while keeping the lifeline taut. The drum upon which the lifeline is wound is therefore biased to rewind the lifeline onto the drum.

Fall arrest devices, including self-retracting lifeline devices, do not prevent a user from falling. Rather, they arrest the descent of the user's fall and attempt to limit any injuries sustained as a result of the fall. However, any fall or fall arrest event is likely to result in some distress and trauma to the user, whether mental or physical. It is therefore preferable to reduce the likelihood of the user falling while wearing the fall arrest device.

Often, fall arrest devices are used on roofs, scaffolding, or other raised worksites. One option for reducing the likelihood of a user falling (without making any changes to the worksite itself) is to restrict the length of the safety line (or lifeline) so that the user cannot reach the very edge of the worksite.

An example of a fall arrest device which allows the user to set the maximum length of the safety line that can be paid out is described in U.S. Pat. No. 10,207,128. The maximum length of safety line that can be paid out is controlled by a plurality of gears and a pivot mechanism.

Another example of a fall arrest device comprising a restraint system is the Bornack® BOOT Height securing device.

There is a need for an improved fall arrest device comprising an apparatus for setting or restricting the maximum length of the safety line.

In particular, there is a need for a simple and cost-effective apparatus for setting or restricting the maximum length of the safety line that can be incorporated into an existing fall arrest device.

SUMMARY

The present disclosure provides a fall arrest device and an apparatus for setting the length of safety line that can be paid out from a fall arrest device.

In some non-limiting embodiments or aspects, a fall arrest device may include a drum configured to have a safety line wound thereon; a speed responsive engagement assembly arranged to inhibit rotation of the drum above a predetermined rotational speed; and a traveller configured to move in response to rotation of the drum. The traveller may be configured to activate the speed responsive engagement assembly when a predetermined length of safety line has been paid out. The traveller may also be referred to as an actuator or an actuator member.

In some non-limiting embodiments or aspects, the speed responsive engagement assembly may be a mechanism that prevents further pay out of the safety line and may be activated when the rotation of the drum reaches a speed indicative of a fall arrest event.

In some non-limiting embodiments or aspects, the present disclosure provides a technical advantage of not requiring an additional locking mechanism to be incorporated into the fall arrest device. In some non-limiting embodiments or aspects, the traveller may activate or engage the speed responsive engagement assembly of the fall arrest device when a predetermined length of safety line has been paid out from the drum. Thus, the present disclosure does not require a separate load bearing locking mechanism to be incorporated into the fall arrest device, thereby reducing cost, weight and complexity of the device. The present disclosure is safer and more reliable, as no override mechanism is required.

The traveller may be configured to move transversely to the rotational axis of the drum in response to rotation of the drum to pay out and retract safety line. Thus, in some non-limiting embodiments or aspects, the traveller does not move along (or parallel to) the axis of rotation of the drum.

In some non-limiting embodiments or aspects, as the traveller engages or activates the existing speed responsive engagement assembly of the fall arrest device, the traveller is not load bearing. This means that the traveller can be made of plastic, or other light and cost-effective material.

In some non-limiting embodiments or aspects, the traveller may be configured to slide transversely to the rotational axis of the drum.

In some non-limiting embodiments or aspects, the traveller may be configured to move outwards in response to rotation of the drum to pay out safety line. In some non-limiting embodiments or aspects, the traveller may be configured to move radially outwards in response to the rotation of the drum to pay out safety line.

In some non-limiting embodiments or aspects, the traveller may be configured to move inwards in response to rotation of the drum to pay out safety line. In some non-limiting embodiments or aspects, the traveller may be configured to move radially inwards in response to the rotation of the drum to pay out safety line.

In some non-limiting embodiments or aspects, the traveller may be configured to move linearly (e.g. along a straight line or a straight path). In some non-limiting embodiments or aspects, the traveller may be moveable between a start position and an end position, wherein the end position is arranged such that the traveller engages a component of the speed responsive engagement assembly. In some non-limiting embodiments or aspects, the end position may be spaced further from the rotational axis of the fall arrest drum than the start position. Optionally, the end position is located radially outwards of the start position. In some non-limiting embodiments or aspects, the end position may be located closer to the rotational axis of the fall arrest drum than the start position. Optionally, the end position is located radially inwards of the start position. In some non-limiting embodiments or aspects, the start and end positions may be aligned along a radial path.

In some non-limiting embodiments or aspects, the start position of the traveller can be adjusted to set the predetermined length of safety line that can be paid out from the drum. It will be appreciated that there are a number of ways in which the start position of the traveller can be adjusted. Optionally, the traveller may be moved manually (by hand), or an actuator may be provided to adjust the start position of the traveller. In some non-limiting embodiments or aspects, the predetermined length of safety line that can be paid out can be adjusted to restrain the user from the edge of a worksite or other location at which a fall may occur. Therefore, this helps to reduce the risk of a fall, while still arresting the user's descent if a fall should occur. In some non-limiting embodiments or aspects, the distance of the start position of the traveller from the rotational axis of the drum may set the predetermined length of safety line that can be paid out.

If the traveller is configured to move outwards in response to rotation of the drum to pay out safety line, the closer the start position of the traveller is to the rotational axis of the drum, the longer the predetermined length of safety line is. Accordingly, to reduce the length of safety line that can be paid out from the device, the start position of the traveller may be adjusted to move towards the circumference of the drum. If the traveller is configured to move inwards in response to rotation of the drum to pay out safety line, the further away the start position of the traveller is from the rotational axis of the drum, the longer the predetermined length of safety line is. In other words, to reduce the length of safety line that can be paid out from the device, the start position of the traveller may be adjusted to move towards the center of the drum.

In some non-limiting embodiments or aspects, the speed responsive engagement assembly may include a pawl and a pawl stop formation. In the end position, the traveller may be configured to move the pawl into engagement with the pawl stop formation. In some non-limiting embodiments or aspects, the traveller may be configured to push the pawl into engagement with the pawl stop formation. In some non-limiting embodiments or aspects, the traveller may be configured to pull the pawl into engagement with the pawl stop formation. In some non-limiting embodiments or aspects, the speed responsive engagement assembly may include a plurality of pawls. The traveller may be configured to move one of the pawls into engagement with the pawl stop formation. The speed responsive engagement assembly may be as defined in WO2016/120614.

In some non-limiting embodiments or aspects, each pawl may be pivotally mounted on a pawl carrier and the pawl carrier may be mounted to rotate with the drum. Each pawl may be biased by a spring towards a home position in which the pawl does not engage the pawl stop formation. In a fall arrest event, the speed at which the drum and pawl carrier rotates causes the pawls to pivot radially outwards to an activated position, as the centrifugal force overcomes the biasing force of the springs. This causes one of the pawls to engage the pawl stop formation, thereby preventing further safety line being paid out. Thus, a centrifugal speed responsive engagement assembly may be provided. The speed responsive engagement assembly may be as defined in WO2008/007119.

In some non-limiting embodiments or aspects, the pawl stop formation may be mounted to rotate with the drum and each pawl may be mounted to a chassis or a housing of the fall arrest device. The pawl stop formation may be a locking disc, or a ratchet wheel.

As described in WO2008/007119, each pawl may be pivotably mounted to the chassis or the housing of the fall arrest device. In normal operation, the ratchet wheel teeth may contact the pawl(s) as it rotates, generating an oscillating movement of the pawl from a first position towards a second position with an amplitude dependent on the speed of rotation. In a fall arrest event, the oscillating movement may bring the pawl into an engaged position with the ratchet wheel, preventing further safety line being paid out.

In some non-limiting embodiments or aspects, the traveller may be configured to move radially inwards in response to the rotation of the drum to rewind safety line. In some non-limiting embodiments or aspects, the traveller may be configured to move radially outwards in response to the rotation of the drum to rewind safety line. In some non-limiting embodiments or aspects, the fall arrest device may be a self-retracting lifeline device (or SRL), and the drum may be biased to retract or rewind safety line onto the drum.

In some non-limiting embodiments or aspects, the traveller may move towards the start position in response to the drum rotating to rewind or retract the safety line. In some non-limiting embodiments or aspects, the fall arrest device further may include a mechanism configured to intermittently arrest movement of the traveller while allowing the drum to continue to rotate. In some non-limiting embodiments or aspects, the fall arrest device further may include a traveller plate having a curved path that extends outwards towards the circumference of the traveller plate, wherein a portion of the traveller is received in the curved path. In some non-limiting embodiments or aspects, the traveller may include a projection which is arranged to be seated within the curved path of the traveller plate. The projection may be pin or peg. In some non-limiting embodiments or aspects, the curved path may be a helical path. In some non-limiting embodiments or aspects, the helical path may include a plurality of turns extending outwards from the center of the traveller plate.

In some non-limiting embodiments or aspects, the fall arrest device may further include a carrier plate mounted to rotate with the drum, wherein the carrier plate may include a guide into which a portion of the traveller is received. In some non-limiting embodiments or aspects, the traveller plate and the carrier plate may include a central aperture through which a bolt or other mechanical fixing is received to mount the traveller plate and the carrier plate to the fall arrest device. In some non-limiting embodiments or aspects, the carrier plate may be mounted to the speed responsive engagement assembly. For example, the carrier plate may be mounted to the pawl carrier. In some non-limiting embodiments or aspects, the traveller may be slidably mounted in or to the guide of the carrier plate.

In some non-limiting embodiments or aspects, the guide may include a radial channel. The traveller may be mounted within the radial channel. Additionally or alternatively, the guide may include a runner or a rail to which the traveller is mounted. The runner or rail may extend radially. In some non-limiting embodiments or aspects, the traveller may be sandwiched between the traveller plate and the carrier plate. In some non-limiting embodiments or aspects, the traveller plate can be rotated relative to the carrier plate in order to adjust the start position of the traveller along the curved path. In some non-limiting embodiments or aspects, the traveller plate may be rotated by hand in order to adjust or set the start position of the traveller. Alternatively, an actuator may be provided in order to rotate the traveller plate relative to the carrier plate.

In some non-limiting embodiments or aspects, in response to rotation of the drum to pay out safety line, the traveller may travel outwards along the curved path in the traveller plate and move along the guide in the carrier plate in a radially outwards direction. In some non-limiting embodiments or aspects, in response to rotation of the drum to pay out safety line, the traveller may travel inwards along the curved path in the traveller plate and move along the guide in the carrier plate in a radially inwards direction. In some non-limiting embodiments or aspects, the traveller plate may be mounted within the fall arrest device such that it does not rotate in response to rotation of the carrier plate or the drum. The traveller plate may be mounted in a fixed position. In some non-limiting embodiments or aspects, the traveller plate may be mounted to rotate in response to rotation of the drum to pay out safety line.

In some non-limiting embodiments or aspects, the fall arrest device may include a mechanism configured to intermittently arrest rotation of the traveller plate while allowing the carrier plate to rotate relative to the traveller plate. This may be advantageous as it increases the maximum predetermined length of safety line without increasing the length of the curved path in the traveller plate. For example, the traveller may be configured to only move along the curved path in the traveller plate in response to relative rotation between the carrier plate and the traveller plate. If the traveller plate rotates with the carrier plate (at the same rate of rotation) then movement of the traveller may be arrested.

In some non-limiting embodiments or aspects, the mechanism may include a stopper configured to be moveable between an engaged position and a disengaged position, wherein, in the engaged position, the stopper is configured to prevent the traveller plate from rotating. In some non-limiting embodiments or aspects, the stopper may be biased towards the engaged position by one or more biasing members. In some non-limiting embodiments or aspects, one or more abutment members may be mounted to the traveller plate. The one or more abutment members may be arranged to abut the stopper when the stopper is in the engaged position. In some non-limiting embodiments or aspects, a plurality of abutment members may be mounted to the traveller plate. The abutment members may include radial spokes or rods.

In some non-limiting embodiments or aspects, the mechanism may include an offset plate or offset member mounted between the traveller plate and the carrier plate. The offset plate or offset member may be configured to offset the rate of rotation of the traveller plate from the carrier plate. In some non-limiting embodiments or aspects, the offset plate may include one or more push formations configured to engage the stopper and move it into the disengaged position. In some non-limiting embodiments or aspects, the offset plate may include a plurality of circumferentially spaced push formations. The push formations may extend from the circumference of the offset plate. In some non-limiting embodiments or aspects, the offset plate may be mounted to the carrier plate. The offset plate may be snap-fit to the carrier plate.

It will be appreciated that the apparatus for setting the predetermined length of safety line may be provided separately to the fall arrest device. The apparatus (or restraint apparatus) may be retrofitted to (or attached to) an existing fall arrest device.

In some non-limiting embodiments or aspects, an apparatus for setting a length of safety line that can be paid out from a fall arrest device may include a drum onto which the safety line is wound, a traveller plate having a curved path that extends outwards towards the circumference of the traveller plate, a carrier plate having a guide, and a traveller configured to be moveably mounted to or within the guide. A portion of the traveller may be arranged to be received in the curved path of the traveller plate. In response to rotation of the drum to pay out safety line, the traveller may move along the curved path of the traveller plate and may be urged along the guide of the carrier plate.

It will be appreciated that any feature or embodiment of the first aspect of the disclosure may form part of the second aspect of the disclosure. In particular, the traveller, traveller plate and/or carrier plate may be as defined in any embodiment of the first aspect of the disclosure.

The traveller plate, traveller and carrier plate may be made of plastic or other light-weight inexpensive material. This is possible because the apparatus is not load bearing, even in a fall arrest event. The guide may extend in a direction transverse to the rotational axis of the fall arrest drum. Optionally, the guide extends in a radial direction.

In some non-limiting embodiments or aspects, the apparatus further may include a mechanism configured to intermittently arrest rotation of the traveller plate while allowing the carrier plate to rotate relative to the traveller plate. In some non-limiting embodiments or aspects, the mechanism may include a stopper configured to be moveable between an engaged position and a disengaged position, wherein in the engaged position the stopper is configured to prevent the traveller plate from rotating. In some non-limiting embodiments or aspects, one or more biasing members may be provided. In some non-limiting embodiments or aspects, each biasing member may be configured to bias the stopper towards the engaged position.

In some non-limiting embodiments or aspects, the apparatus may further include one or more abutment members mounted to the traveller plate. The one or more abutment members may be arranged to abut the stopper in the engaged position. In some non-limiting embodiments or aspects, a plurality of abutment members may be mounted to the traveller plate. The abutment members may include radial spokes or rods. In some non-limiting embodiments or aspects, the mechanism further may include an offset plate configured to be mounted between the traveller plate and the carrier plate, wherein the offset plate may include one or more push formations configured to engage the stopper and move it into the disengaged position. In some non-limiting embodiments or aspects, the offset plate may include a plurality of circumferentially spaced push formations. In some non-limiting embodiments or aspects, the offset plate may be configured to snap-fit to the carrier plate.

In some non-limiting embodiments or aspects, the offset plate may include a projection configured to mate with a corresponding opening in the carrier plate. In some non-limiting embodiments or aspects, the offset plate may include an opening configured to mate with a corresponding projection on the carrier plate. In some non-limiting embodiments or aspects, the traveller plate, carrier plate and the offset plate may each include a central aperture for receiving a bolt or other mechanical fixing therethrough.

Further non-limiting embodiments or aspects are set forth in the following numbered clauses:

Clause 1. A fall arrest device comprising: a drum configured to have a safety line wound thereon; a speed responsive engagement assembly arranged to inhibit rotation of the drum above a predetermined rotational speed; and a traveller configured to move in response to rotation of the drum, wherein the traveller is configured to activate the speed responsive engagement assembly when a predetermined length of safety line has been paid out.

Clause 2. The fall arrest device of clause 1, wherein the traveller is configured to move transversely to the rotational axis of the drum.

Clause 3. The fall arrest device of clause 1 or 2, wherein the traveller is configured to move outwards, or radially outwards, in response to the rotation of the drum to pay out safety line.

Clause 4. The fall arrest device of any of clauses 1-3, wherein the traveller is configured to move inwards, or radially inwards, in response to the rotation of the drum to pay out safety line.

Clause 5. The fall arrest device of any of clauses 1-4, wherein the traveller is moveable between a start position and an end position, wherein the end position is arranged such that the traveller engages a component of the speed responsive engagement assembly.

Clause 6. The fall arrest device of any of clauses 1-5, wherein the start position of the traveller can be adjusted to set the predetermined length of safety line.

Clause 7. The fall arrest device of any of clauses 1-6, wherein the speed responsive engagement assembly comprises a pawl and a pawl stop formation and, in the end position, the traveller is configured to move the pawl into engagement with the pawl stop formation.

Clause 8. The fall arrest device of any of clauses 1-7, wherein the speed responsive engagement assembly comprises a plurality of pawls pivotally mounted on a pawl carrier and the pawl carrier is mounted to rotate with the drum; or wherein the pawl stop formation is a ratchet wheel mounted to rotate with the drum and the pawl is mounted to a chassis or a housing of the fall arrest device.

Clause 9. The fall arrest device of any of clauses 1-8, wherein the traveller is configured to move radially inwards, or radially outwards, in response to the rotation of the drum to rewind safety line.

Clause 10. The fall arrest device of any of clauses 1-9, comprising a mechanism configured to intermittently arrest movement of the traveller while allowing the drum to continue to rotate.

Clause 11. The fall arrest device of any of clauses 1-10, further comprising a traveller plate having a curved path that extends outwards towards the circumference of the traveller plate, wherein a portion of the traveller is received in the curved path.

Clause 12. The fall arrest device of any of clauses 1-11, wherein the traveller comprises a projection which is seated within the curved path of the traveller plate.

Clause 13. The fall arrest device of any preceding clause, wherein the curved path is a helical path.

Clause 14. The fall arrest device of any of clauses 1-13, further comprising a carrier plate mounted to rotate with the drum, wherein the carrier plate comprises a guide into which a portion of the traveller is received.

Clause 15. The fall arrest device of any of clauses 1-14, wherein the traveller is slidably mounted in or to the guide of the carrier plate.

Clause 16. The fall arrest device of any of clauses 1-15, wherein the guide comprises a radial channel.

Clause 17. The fall arrest device of any of clauses 1-16, wherein the traveller is sandwiched between the traveller plate and the carrier plate.

Clause 18. The fall arrest device of any of clauses 1-17, wherein the traveller plate can be rotated relative to the carrier plate in order to adjust the start position of the traveller along the curved path.

Clause 19. The fall arrest device of any of clauses 1-18, wherein in response to rotation of the drum to pay out safety line, the traveller travels outwards along the curved path in the traveller plate and moves along the guide in the carrier plate in a radially outwards direction.

Clause 20. The fall arrest device of any of clauses 1-19, wherein in response to rotation of the drum to pay out safety line, the traveller travels inwards along the curved path in the traveller plate and moves along the guide in the carrier plate in a radially inwards direction.

Clause 21. The fall arrest device of any of clauses 1-20, wherein the traveller plate is mounted within the fall arrest device such that it does not rotate in response to rotation of the carrier plate or the drum.

Clause 22. The fall arrest device of any of clauses 1-21, wherein the traveller plate is mounted to rotate in response to rotation of the drum to pay out safety line.

Clause 23. The fall arrest device of any of clauses 1-22, further comprising a mechanism configured to intermittently arrest rotation of the traveller plate while allowing the carrier plate to rotate relative to the traveller plate.

Clause 24. The fall arrest device of any of clauses 1-23, wherein the mechanism comprises a stopper configured to be moveable between an engaged position and a disengaged position, wherein in the engaged position the stopper is configured to prevent the traveller plate from rotating.

Clause 25. The fall arrest device of any of clauses 1-24, wherein the stopper is biased towards the engaged position by one or more biasing members.

Clause 26. The fall arrest device of any of clauses 1-25, further comprising one or more abutment members mounted to the traveller plate, wherein the one or more abutment members are arranged to abut the stopper in the engaged position.

Clause 27. The fall arrest device of any of clauses 1-26, wherein the mechanism further comprises an offset plate mounted between the traveller plate and the carrier plate, wherein the offset plate comprises one or more push formations configured to engage the stopper and move it into the disengaged position.

Clause 28. The fall arrest device of any of clauses 1-27, wherein the offset plate comprises a plurality of circumferentially spaced push formations.

Clause 29. The fall arrest device of any of clauses 1-28, wherein the offset plate is mounted to the carrier plate.

Clause 30. The fall arrest device of any of clauses 1-29, wherein the fall arrest device is a self-retracting lifeline (SRL) device.

Clause 31. An apparatus for setting the length of safety line that can be paid out from a fall arrest device, the fall arrest device comprising a drum onto which the safety line is wound, wherein the apparatus comprises: a traveller plate having a curved path that extends outwards towards the circumference of the traveller plate; a carrier plate comprising a guide; and a traveller configured to be moveably mounted to or within the guide, wherein a portion of the traveller is arranged to be received in the curved path of the traveller plate, and wherein, in response to rotation of the drum to pay out safety line, the traveller moves along the curved path of the traveller plate and is urged along the guide of the carrier plate.

Clause 32. The apparatus of clause 31, wherein the traveller is as defined in any of the preceding claims.

Clause 33. The apparatus of clause 31 or 32, wherein the traveller plate and/or the carrier plate is as defined in any preceding claim.

Clause 34. The apparatus of any of clauses 31-33, further comprising a mechanism configured to intermittently arrest rotation of the traveller plate while allowing the carrier plate to rotate relative to the traveller plate.

Clause 35. The apparatus of any of clauses 31-34, wherein the mechanism comprises a stopper configured to be moveable between an engaged position and a disengaged position, wherein in the engaged position the stopper is configured to prevent the traveller plate from rotating.

Clause 36. The apparatus of any of clauses 31-35, further comprising one or more biasing members configured to bias the stopper towards the engaged position.

Clause 37. The apparatus of any of clauses 31-36, further comprising one or more abutment members mounted to the traveller plate, wherein the one or more abutment members are arranged to abut the stopper in the engaged position.

Clause 38. The apparatus of any of any of clauses 31-37, wherein the mechanism further comprises an offset plate configured to be mounted between the traveller plate and the carrier plate, wherein the offset plate comprises one or more push formations configured to engage the stopper and move it into the disengaged position.

Clause 39. The apparatus of any of clauses 31-38, wherein the offset plate comprises a plurality of circumferentially spaced push formations.

Clause 40. The apparatus of any of clauses 31-39, wherein the offset plate comprises a projection configured to mate with a corresponding opening in the carrier plate and/or wherein the offset plate comprises an opening configured to mate with a corresponding projection on the carrier plate.

Clause 41. A fall arrest device comprising: a drum configured to have a safety line wound thereon; a speed responsive engagement assembly arranged to inhibit rotation of the drum above a predetermined rotational speed; and a traveller configured to move in response to rotation of the drum, wherein the traveller is configured to activate the speed responsive engagement assembly when a predetermined length of safety line has been paid out.

Clause 42. The fall arrest device of clause 41, wherein the traveller is configured to move transversely to the rotational axis of the drum.

Clause 43. The fall arrest device of clause 41 or 42, wherein the traveller is configured to move outwards, or radially outwards, in response to the rotation of the drum to pay out safety line.

Clause 44. The fall arrest device of any of clauses 41-43, wherein the traveller is configured to move inwards, or radially inwards, in response to the rotation of the drum to pay out safety line.

Clause 45. The fall arrest device of any of clauses 41-44, wherein the traveller is moveable between a start position and an end position, wherein the end position is arranged such that the traveller engages a component of the speed responsive engagement assembly.

Clause 46. The fall arrest device of any of clauses 41-45, wherein the start position of the traveller can be adjusted to set the predetermined length of safety line.

Clause 47. The fall arrest device of any of clauses 41-46, wherein the speed responsive engagement assembly comprises a pawl and a pawl stop formation and, in the end position, the traveller is configured to move the pawl into engagement with the pawl stop formation.

Clause 48. The fall arrest device of any of clauses 41-47, wherein the speed responsive engagement assembly comprises a plurality of pawls pivotally mounted on a pawl carrier and the pawl carrier is mounted to rotate with the drum; or wherein the pawl stop formation is a ratchet wheel mounted to rotate with the drum and the pawl is mounted to a chassis or a housing of the fall arrest device.

Clause 49. The fall arrest device of any of clauses 41-48, wherein the traveller is configured to move radially inwards, or radially outwards, in response to the rotation of the drum to rewind safety line.

Clause 50. The fall arrest device of any of clauses 41-49, comprising a mechanism configured to intermittently arrest movement of the traveller while allowing the drum to continue to rotate.

Clause 51. The fall arrest device of any of clauses 41-50, further comprising a traveller plate having a curved path that extends outwards towards the circumference of the traveller plate, wherein a portion of the traveller is received in the curved path.

Clause 52. The fall arrest device of any of clauses 41-51, wherein the traveller comprises a projection which is seated within the curved path of the traveller plate.

Clause 53. The fall arrest device of any preceding clause, wherein the curved path is a helical path.

Clause 54. The fall arrest device of any of clauses 41-53, further comprising a carrier plate mounted to rotate with the drum, wherein the carrier plate comprises a guide into which a portion of the traveller is received.

Clause 55. The fall arrest device of any of clauses 41-54, wherein the traveller is slidably mounted in or to the guide of the carrier plate.

Clause 56. The fall arrest device of any of clauses 41-55, wherein the guide comprises a radial channel.

Clause 57. The fall arrest device of any of clauses 41-56, wherein the traveller is sandwiched between the traveller plate and the carrier plate.

Clause 58. The fall arrest device of any of clauses 41-57, wherein the traveller plate can be rotated relative to the carrier plate in order to adjust the start position of the traveller along the curved path.

Clause 59. The fall arrest device of any of clauses 41-58, wherein in response to rotation of the drum to pay out safety line, the traveller travels outwards along the curved path in the traveller plate and moves along the guide in the carrier plate in a radially outwards direction.

Clause 60. The fall arrest device of any of clauses 41-59, wherein in response to rotation of the drum to pay out safety line, the traveller travels inwards along the curved path in the traveller plate and moves along the guide in the carrier plate in a radially inwards direction.

Clause 61. The fall arrest device of any of clauses 41-60, wherein the traveller plate is mounted within the fall arrest device such that it does not rotate in response to rotation of the carrier plate or the drum.

Clause 62. The fall arrest device of any of clauses 41-61, wherein the traveller plate is mounted to rotate in response to rotation of the drum to pay out safety line.

Clause 63. The fall arrest device of any of clauses 41-62, further comprising a mechanism configured to intermittently arrest rotation of the traveller plate while allowing the carrier plate to rotate relative to the traveller plate.

Clause 64. The fall arrest device of any of clauses 41-63, wherein the mechanism comprises a stopper configured to be moveable between an engaged position and a disengaged position, wherein in the engaged position the stopper is configured to prevent the traveller plate from rotating.

Clause 65. The fall arrest device of any of clauses 41-64, wherein the stopper is biased towards the engaged position by one or more biasing members.

Clause 66. The fall arrest device of any of clauses 41-65, further comprising one or more abutment members mounted to the traveller plate, wherein the one or more abutment members are arranged to abut the stopper in the engaged position.

Clause 67. The fall arrest device of any of any of clauses 41-66, wherein the mechanism further comprises an offset plate mounted between the traveller plate and the carrier plate, wherein the offset plate comprises one or more push formations configured to engage the stopper and move it into the disengaged position.

Clause 68. The fall arrest device of any of clauses 41-67, wherein the offset plate comprises a plurality of circumferentially spaced push formations.

Clause 69. The fall arrest device of any of clauses 41-68, wherein the offset plate is mounted to the carrier plate.

Clause 70. The fall arrest device of any of clauses 41-69, wherein the fall arrest device is a self-retracting lifeline (SRL) device.

Clause 71. An apparatus for setting the length of safety line that can be paid out from a fall arrest device, the fall arrest device comprising a drum onto which the safety line is wound, wherein the apparatus comprises: a traveller plate having a curved path that extends outwards towards the circumference of the traveller plate; a carrier plate comprising a guide; and a traveller configured to be moveably mounted to or within the guide, wherein a portion of the traveller is arranged to be received in the curved path of the traveller plate, and wherein, in response to rotation of the drum to pay out safety line, the traveller moves along the curved path of the traveller plate and is urged along the guide of the carrier plate.

Clause 72. The apparatus of clause 71, wherein the traveller is as defined in any of the preceding claims.

Clause 73. The apparatus of clause 71 or 72, wherein the traveller plate and/or the carrier plate is as defined in any preceding claim.

Clause 74. The apparatus of any of clauses 71-73, further comprising a mechanism configured to intermittently arrest rotation of the traveller plate while allowing the carrier plate to rotate relative to the traveller plate.

Clause 75. The apparatus of any of clauses 71-74, wherein the mechanism comprises a stopper configured to be moveable between an engaged position and a disengaged position, wherein in the engaged position the stopper is configured to prevent the traveller plate from rotating.

Clause 76. The apparatus of any of clauses 71-75, further comprising one or more biasing members configured to bias the stopper towards the engaged position.

Clause 77. The apparatus of any of clauses 71-76, further comprising one or more abutment members mounted to the traveller plate, wherein the one or more abutment members are arranged to abut the stopper in the engaged position.

Clause 78. The apparatus of any of any of clauses 71-77, wherein the mechanism further comprises an offset plate configured to be mounted between the traveller plate and the carrier plate, wherein the offset plate comprises one or more push formations configured to engage the stopper and move it into the disengaged position.

Clause 79. The apparatus of any of clauses 71-78, wherein the offset plate comprises a plurality of circumferentially spaced push formations.

Clause 80. The apparatus of any of clauses 71-79, wherein the offset plate comprises a projection configured to mate with a corresponding opening in the carrier plate and/or wherein the offset plate comprises an opening configured to mate with a corresponding projection on the carrier plate.

These and other features and characteristics of the non-limiting embodiments or aspects described herein will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only.

BRIEF DESCRIPTION OF THE DRAWINGS

Illustrative embodiments of the invention will now be described, by way of example only, with reference to the accompanying drawings, in which.

DETAILED DESCRIPTION

Figure 1:
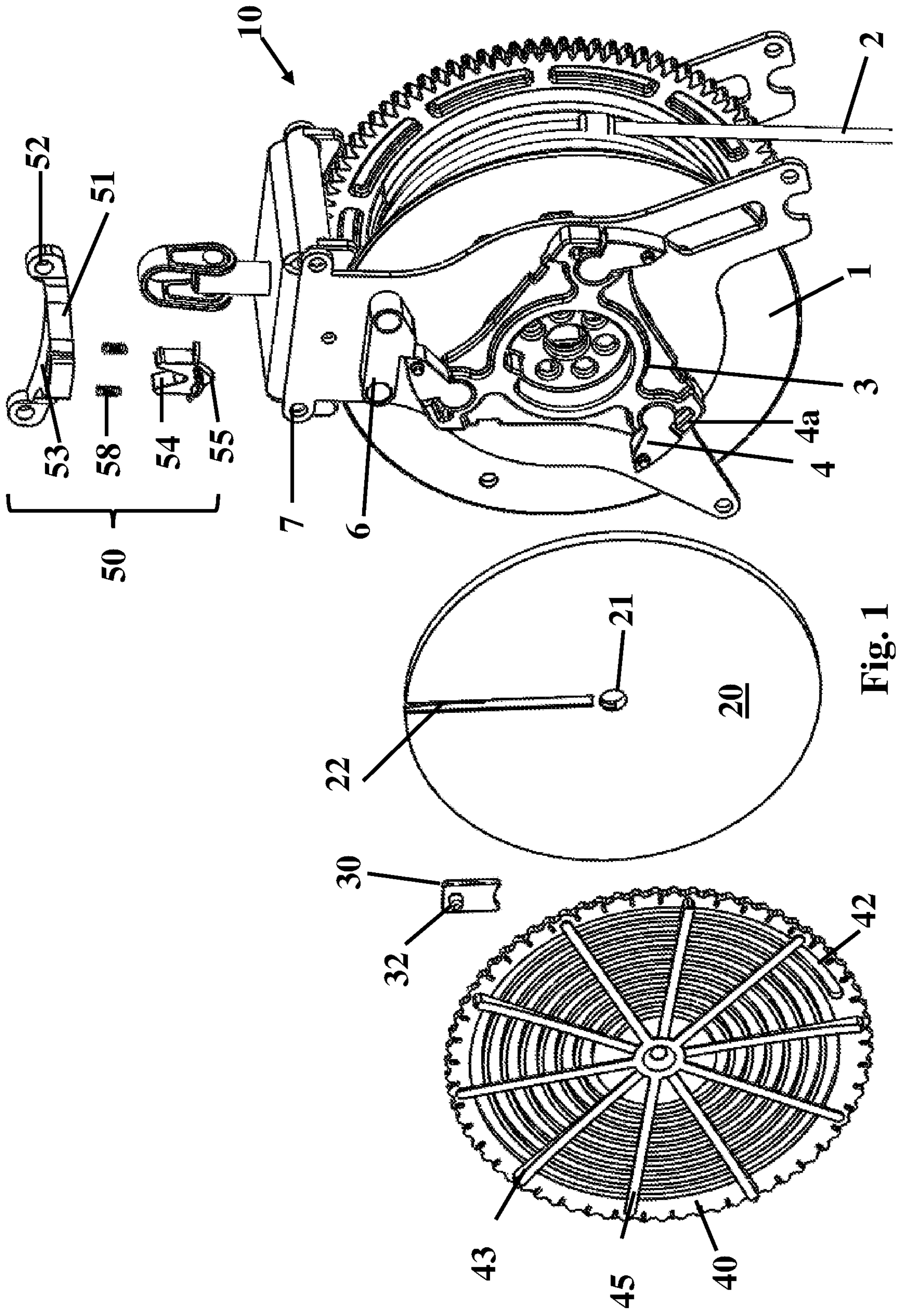
FIG. 1 is an exploded view of a settable length apparatus according to some non-limiting embodiments or aspects of the present disclosure together with a fall arrest device.

As used herein, the singular form of "a", "an", and "the" include plural referents unless the context clearly dictates otherwise.

Spatial or directional terms, such as "left", "right", "inner", "outer", "above", "below", and the like, relate to the embodiments or aspects as shown in the drawing figures and are not to be considered as limiting as the embodiments or aspects can assume various alternative orientations.

All numbers used in the specification and claims are to be understood as being modified in all instances by the term "about". By "about" is meant within plus or minus twenty-five percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms "first", "second", and the like are not intended to refer to any particular order or chronology, but refer to different conditions, properties, or elements.

All documents referred to herein are "incorporated by reference" in their entirety.

The term "at least" is synonymous with "greater than or equal to".

As used herein, "at least one of" is synonymous with "one or more of". For example, the phrase "at least one of A, B, or C" means any one of A, B, or C, or any combination of any two or more of A, B, or C. For example, "at least one of A, B, and C" includes A alone; or B alone; or C alone; or A and B; or A and C; or B and C; or all of A, B, and C.

The word "comprising" and "comprises", and the like, does not exclude the presence of elements or steps other than those listed in any claim or the specification as a whole. In the present specification, "comprises" means "includes" and "comprising" means "including".

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms "perpendicular", "transverse", "substantially perpendicular", or "substantially transverse" mean a relative angle as between two objects at their real or theoretical intersection is from 85° to 90°, or from 87° to 90° , or from 88° to 90°, or from 89° to 90°, or from 89.5° to 90°, or from 89.75° to 90°, or from 89.9° to 90°, inclusive of the recited values.

The discussion of various embodiments or aspects may describe certain features as being "particularly" or "preferably" within certain limitations (e.g., "preferably", "more preferably", or "even more preferably", within certain limitations). It is to be understood that the disclosure is not limited to these particular or preferred limitations but encompasses the entire scope of the various embodiments and aspects described herein.

The disclosure comprises, consists of, or consists essentially of, the following embodiments or aspects, in any combination. Various embodiments or aspects of the disclosure are illustrated in separate drawing figures. However, it is to be understood that this is simply for ease of illustration and discussion. In the practice of the disclosure, one or more embodiments or aspects shown in one drawing figure can be combined with one or more embodiments or aspects shown in one or more of the other drawing figures.

It will be appreciated that FIGS. 1 to 18 are schematic illustrations and so features shown therein are not drawn to scale.

FIG. 1 is an exploded view of a settable length apparatus according to some non- limiting embodiments or aspects of the present disclosure together with a fall arrest device 10.

The fall arrest device 10 shown is a self-retracting lifeline device of the type described in WO2016/120614. However, it will be appreciated that other types of fall arrest or fall protection device could be used together with the settable length apparatus of the present disclosure.

The fall arrest device 10 includes a rotatable drum 1 with a safety line 2 wound thereon. The drum 1 is mounted to a rotatable shaft (not shown). The drum 1 is biased by a rewind mechanism (not shown) to rewind the safety line 2 onto the drum 1, thus it is a self-retracting lifeline device.

A speed responsive engagement assembly is provided which includes a pawl carrier 3, pawls 4 and a pawl stop formation 6. In the embodiment shown in FIG. 1 the speed responsive engagement assembly is as described in WO2016/120614 and is mounted to a collar of the shaft by an energy absorber ring (not shown). However, it will be appreciated that other speed responsive engagement assemblies could be provided, such as those described in detail in WO2008/007119 (see FIG. 17).

In some non-limiting embodiments or aspects, three spaced pawls 4 are pivotally mounted to the pawl carrier 3. In some embodiments or aspects, two pawls or four or more pawls may be provided. A biasing spring 4*a* urges each pawl 4 radially inwards towards the pawl carrier 3 into a home position, such that the pawls 4 do not engage the stop formation 6. In normal use, the safety line 2 is paid out from the device 10 causing the drum 1, shaft and pawl carrier 3 to rotate together. In a fall arrest event, the safety line 2 is paid out much more rapidly. The speed at which the drum 1, shaft and pawl carrier 3 rotate causes the pawls 4 to pivot radially outwards to an activated position, as the centrifugal force overcomes the biasing force of the springs 4*a*. This causes one of the pawls 4 to engage the pawl stop formation 6 which is attached to or formed integrally with the chassis frame of the device 10. Once this occurs, the pawl carrier 3 is locked against and fixed with respect to the chassis frame of the device, preventing further rotation of the pawl carrier 3 together with the drum 1 and shaft.

If the torque applied by the fall arrest event is sufficient, the drum 1 and shaft will continue rotation. This can result in further safety line 2 being paid out and the continued descent of a user. In this case, the energy absorber ring (not shown) will absorb the energy of the relative rotation between the pawl carrier 3 and the collar of the shaft until the fall is completely arrested.

It will be appreciated that in some non-limiting embodiments or aspects, an external energy absorber device may be provided rather than an internal energy absorber ring. The external energy absorber device is usually connected between the safety line 2 and the user. Examples of suitable devices are described in WO2017/078669 and WO2019/175543.

In the embodiment or aspect shown in FIG. 1, the settable length apparatus of the present disclosure includes a stop assembly 50, a carrier plate 20, a traveller 30 and a traveller plate 40. The settable length apparatus is configured to be mounted to the pawl carrier 3. Advantageously, the settable length apparatus (i.e. the carrier plate 20, traveller 30 and traveller plate 40 can be attached to an existing fall arrest device 10, as an add-on or bolt-on).

In some non-limiting embodiments or aspects, the carrier plate 20 includes a central aperture 21 for receiving a bolt therethrough. The back of the carrier plate (not shown) may be keyed to the pawl carrier 3. The carrier plate 20 is configured to be mounted to and rotate with the pawl carrier 3.

The carrier plate 20 includes a guide 22 extending from the circumference of the carrier plate 20 towards the central aperture 21. The guide 22 extends transversely to the rotational axis of the drum.

In this embodiment or aspect, the guide 22 is a radial channel. In some non-limiting embodiments or aspects, the guide 22 may additionally or alternatively include one or more runners or guide rails. The traveller 30 may be mounted to slide along a rail or runner of the guide 22.

In the embodiment or aspect shown in FIG. 1, the traveller 30 is configured to be slidably mounted in the radial channel 22 of the carrier plate 20. The traveller 30 includes a projection or protrusion 32. In use, the traveller 30 is sandwiched between the carrier plate 20 and a traveller plate 40.

In some non-limiting embodiments or aspects, a stop assembly 50 is provided including a stopper 54, biasing members 58, and a stopper base 51. The stopper base 51 includes a pair of mounting apertures 52 arranged to align with apertures 7 on the chassis frame of the fall arrest device 10. The stopper 54 is shaped generally V-shaped, having a point 55A and a pair of legs 55B. It will be appreciated that the stopper 54 is not limited to the shape shown in FIG. 1.

In some non-limiting embodiments or aspects, the stopper 54 is moveable between an engaged position, in which the stopper 54 holds the traveller plate 40 in a fixed position, and a disengaged position, in which the traveller plate 40 is free to rotate. An actuator (such as a latch or button) configured to move the stopper 54 may be provided on the housing of the fall arrest device (not shown). The biasing members 58 bias the stopper 54 towards the engaged position.

The traveller plate 40 includes a plurality of radial spokes 43 mounted to the front of the traveller plate 40. The spokes 43 are evenly spaced around the traveller plate 40. In this embodiment or aspect, the traveller plate 40 includes five locking spokes 43 (abutment members 43) and five non-locking spokes 45. As shown in FIG. 1, the locking spokes 43 have a raised profile which is configured to abut the point 55 of the stopper 54, thereby preventing the traveller plate 40 from rotating. The non-locking spokes 45 have a flat profile and are configured to pass underneath the stopper 54 without engaging the point 55. It will be appreciated that, in some non-limiting embodiments or aspects, a different number of locking spokes 43 may be provided and/or the non-locking spokes 45 may not be provided.

Figure 2:
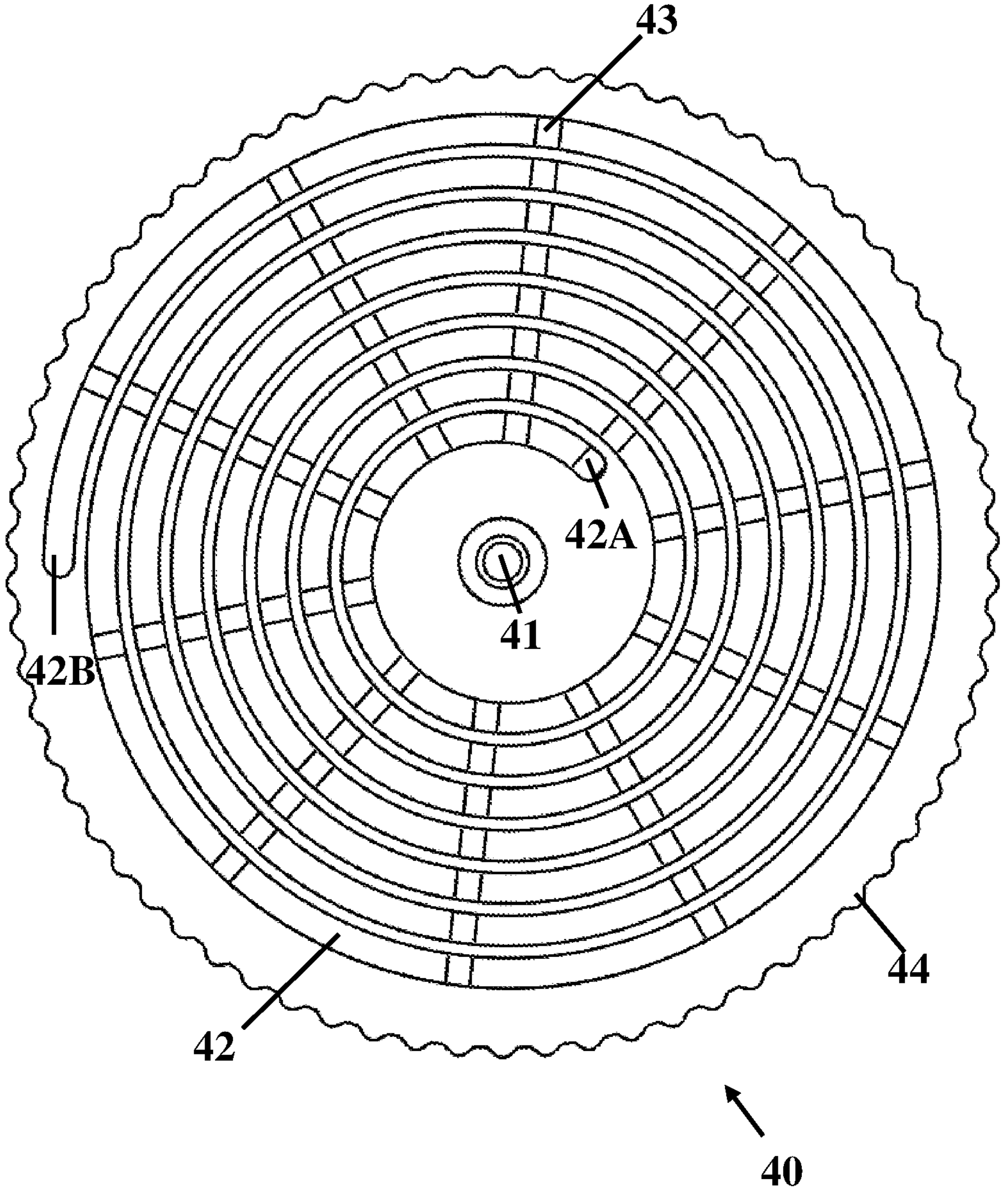
FIG. 2 is a rear view of the traveller plate in FIG. 1.

The traveller plate 40 is shown in more detail in FIG. 2. As shown, the traveller plate 40 includes a central aperture 41 for receiving a bolt therethrough. A single bolt (not shown) may be inserted through apertures 41 and 21 in order to mount the traveller plate 40 and the carrier plate 20 to the pawl carrier 3.

In some non-limiting embodiments or aspects, the circumferential edge of the traveller plate 40 includes teeth 44. The teeth 44 may be configured to allow the traveller plate 40 to be conveniently rotated. For example, the teeth 44 may be configured to receive a pin or dial (not shown). In other examples, the circumference of the traveller plate 40 may be smooth.

A helical path or channel 42 extends from proximate the central aperture 41 radially outwards towards the circumference of the traveller plate 40, between a start point 42A and an end point 42B of the path. The number of turns of the helical path 42 are not limited to the embodiment or aspect shown in FIG. 2. In some non-limiting embodiments or aspects, the helical path 42 may be a curved path (e.g. including one or fewer turns).

In use, the projection 32 of the traveller is received (or seated) in the helical path 42. The start position of the projection 32 of the traveller along the helical path 42 dictates the length of safety line 2 that can be paid out from the device 10.

Figure 3A:
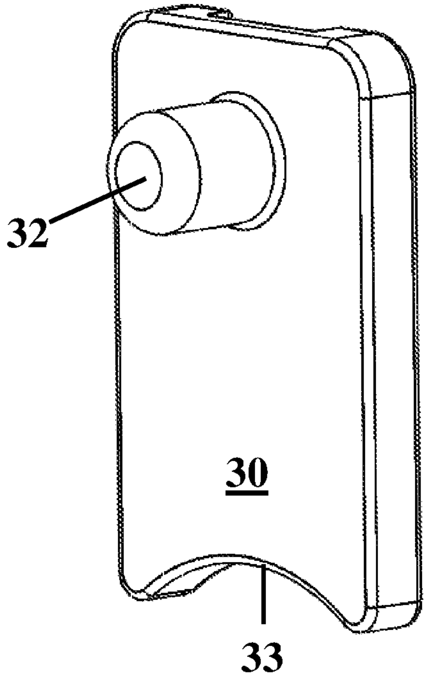
FIG. 3A shows a front view of a traveller according to some non-limiting embodiments or aspects of the present disclosure.
Figure 3B:
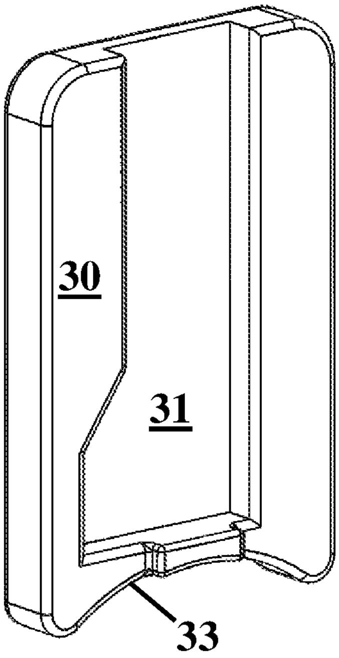
FIG. 3B shows a rear perspective view of the traveller in FIG. 3A.

The traveller 30 is shown in more detail in FIGS. 3A and 3B. FIG. 3A shows a front perspective view of the traveller 30. The projection 32 is a cylindrical peg that projects from the front of the traveller body. The base 33 of the traveller 30 is curved or shaped to fit around the bolt inserted into aperture 21. This increases the maximum travelling distance of the traveller 30 along the radial channel 22, allowing a longer range of lengths of the safety line 2 to be paid out. It will be appreciated that the projection 32 and the traveller 30 are not limited to the shape shown in FIG. 3A.

Figure 4:
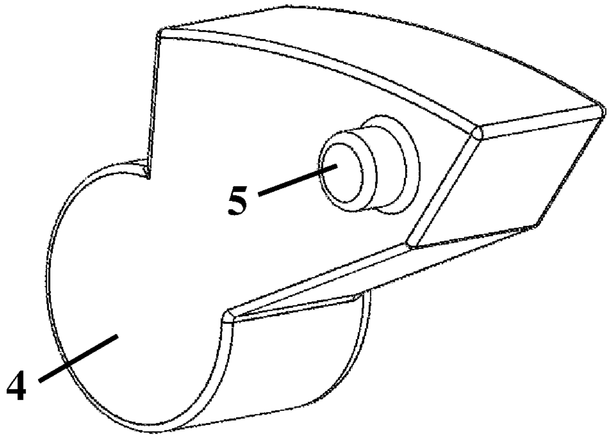
FIG. 4 shows an example of a pawl from a speed engagement arrangement.

The rear of the traveller 30 includes a slot 31 that is shaped to receive the projection 5 of the pawl 4 of the speed responsive engagement assembly (see FIG. 4). In use, the slot 31 in the traveller is positioned in the radial channel 22 which extends through the body of the carrier plate 20. One of the pawls 4 aligns with the traveller 30 such that (when the traveller 30 is in the correct position) the projection 5 is received into the slot 31 and the pawl 4 is pulled into engagement with the pawl stop formation 6.

In some non-limiting embodiments or aspects, the traveller 30 does not include a slot 31 for engaging the pawl 4. The traveller 30 may be configured to push, rather than pull, the pawl 4 into engagement with the pawl stop formation 6.

Figure 5A:
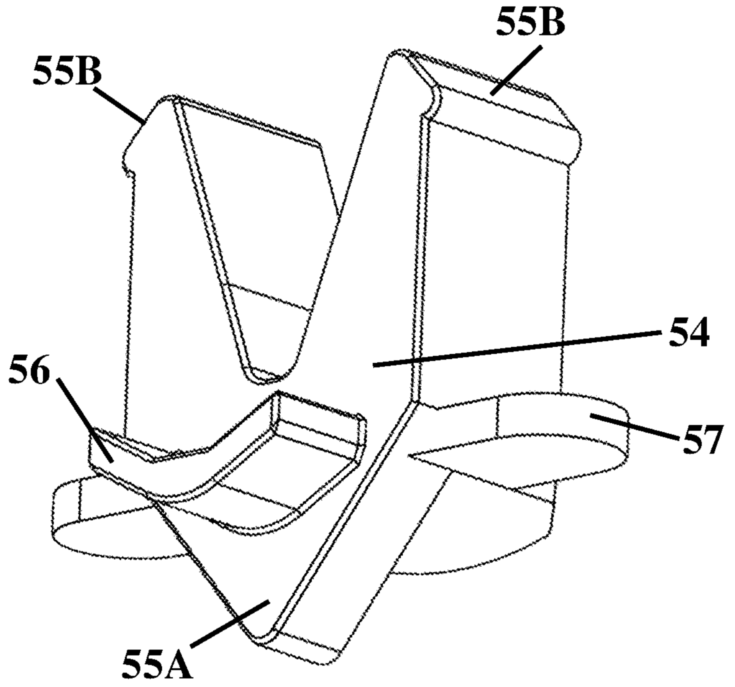
FIG. 5A shows a front perspective view of a stopper from a stopping assembly in accordance with some non-limiting embodiments or aspects of the present disclosure.
Figure 5B:
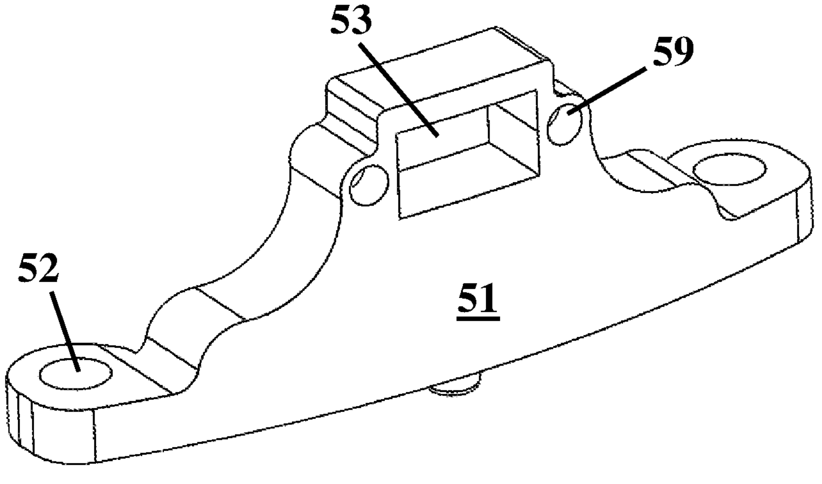
FIG. 5B shows a top perspective view of a base configured to engage the stopper of FIG. 5A.

The stop assembly 50 is shown in more detail in FIGS. 5A and 5B. As shown in FIG. 5*a*, the stopper 54 includes a point 55A which is configured to engage the spokes 43 of the traveller plate 40. The flange portion 56 allows the stopper 54 to be raised and lowered between the disengaged and engaged positions (e.g. by an actuator). When assembled, the stopper 54 is inserted upwards into the opening 53 in the stopper base 51. The legs 55B are compressed slightly to allow the stopper 54 to fit through the opening 53, forming an interference or press fit which retains the stopper 54 within the stopper base 51.

Figure 7A:
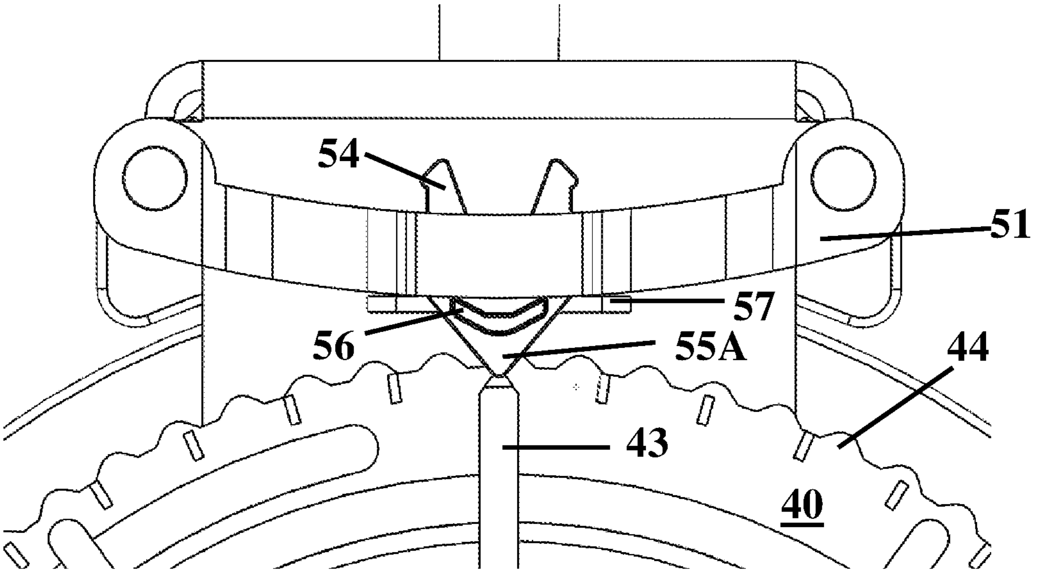
FIG. 7A shows the stopping mechanism of the apparatus in FIG. 6 in a disengaged configuration.

The stopper 54 also includes shoulder portions 57 that in the disengaged position are configured to sit (or press) against the stopper base 51 (see FIG. 7A). The shoulder portions 57 are biased away from the stopper base 51 by biasing members 58 inserted through apertures 59 in the stopper base 51.

Figure 6:
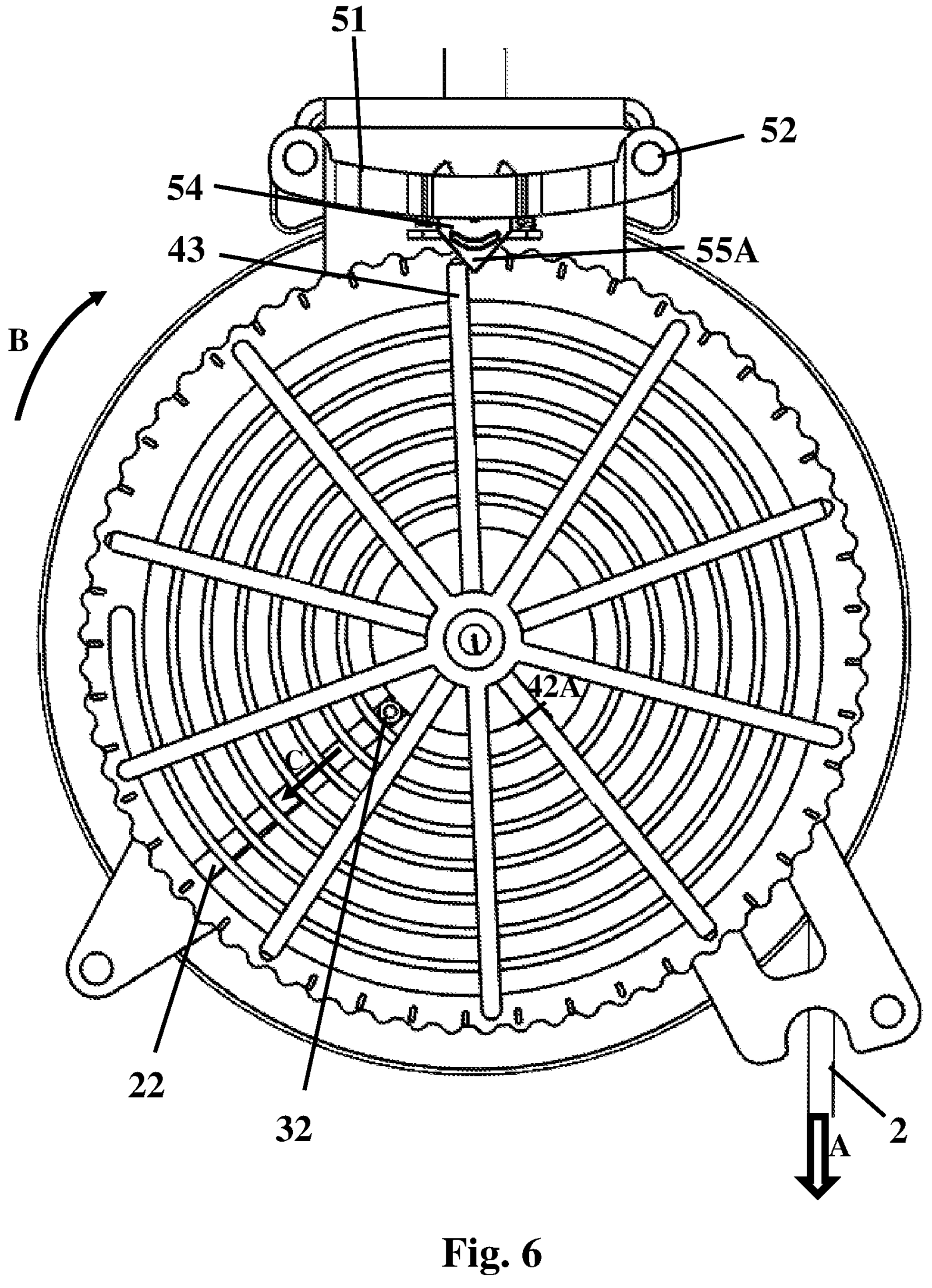
FIG. 6 is a front view of the apparatus and fall arrest device in FIG. 1 when assembled.

FIG. 6 is a front view of the apparatus and fall arrest device 10 in FIG. 1 when assembled. The stopper 54 is in the engaged position. One of the locking spokes 43 abuts the point 55A of the stopper 54, preventing the traveller plate 40 from rotating with the pawl carrier 3. The projection 32 of the traveller 30 is positioned towards the start point 42A of the helical path.

As the safety line 2 is paid out of the device in direction A (under normal conditions, not in a fall arrest event), the drum 1, pawl carrier 3 and carrier plate 20 rotate together in direction B relative to the traveller plate 40 which is held in a fixed position by the stopper 54. This causes the projection 32 of the traveller 30 to move along the helical path 42 of the traveller plate 40 in the direction of arrow B. This results in the traveller 30 sliding radially outwards along the radial channel 22 in the carrier plate 20 in the linear direction shown by arrow C in FIG. 6.

Under normal conditions, the traveller 30 will move linearly radially outwards along the radial channel 22 until a pawl 4 of the speed responsive engagement assembly is received in the slot 31 of the traveller 30 and the pawl 4 is pushed into engagement with the pawl stop formation 6. This locks the pawl carrier 3 and prevents further safety line 2 being paid out, as described above. Thus, the closer the initial position of the traveller 30 is to the start point 42A of the helical path in the traveller plate 40, the more safety line 2 can be paid out before the speed responsive engagement assembly locks the device 10. For example, the start position of the traveller 30 can be set to ensure that the user is restrained from the edge of a worksite, as the maximum amount of safety line 2 that can be paid out before the traveller 30 engages the pawl 4 is less than the distance to the edge of the worksite.

If a fall arrest event occurs before the traveller 30 reaches the position where the pawl 4 is pulled (or pushed) into engagement with the pawl stop formation 6, the speed responsive engagement mechanism engages as it would without the settable length apparatus being present.

If the force in direction A pulling (or tensioning) the safety line 2 is removed before the traveller 30 engages the pawl 4, then the drum 1 will rotate in the direction opposite to arrow B (anticlockwise) to retract the safety line 2 onto the drum 1. The traveller plate 40 remains held in the fixed position relative to the carrier plate 20. This will cause the traveller 30 to travel back along the helical path 42 towards the start position 42A, resulting in the traveller 30 sliding radially inwards along channel 22 in the opposite direction to arrow C.

Advantageously, the carrier plate 20, traveller plate 40, traveller 30, and stop assembly 50 are not load bearing, even in a fall arrest event. As such, they can be made of plastic which is cost effective and lightweight.

Figure 7B:
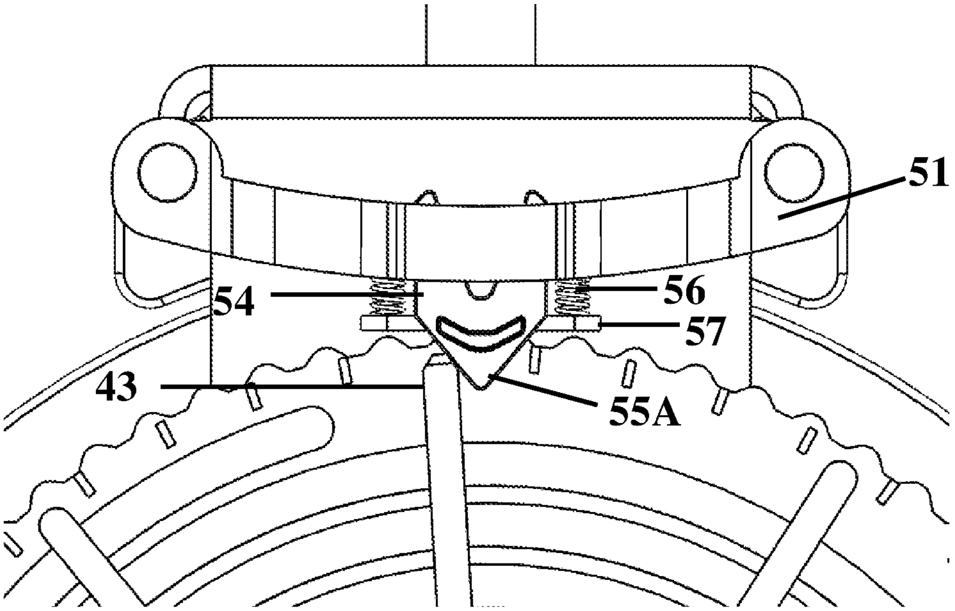
FIG. 7B shows the stopping assembly of the apparatus in FIG. 6 in an engaged configuration.

FIGS. 7A and 7B show one embodiment or aspect of how the start position of the traveller 30 can be adjusted to set the length of the safety line that can be paid out.

In FIG. 7A, the stopper 54 is shown in the disengaged position. To move to this position, the flange portion 56 can be pushed to raise the stopper 54 away from locking spokes 43 of the traveller plate 40 until the shoulder portions 57 press against the stopper base 51. The traveller plate 40 can then be rotated relative to the carrier plate 20 to move the traveller 30,32 along the helical path 42. The traveller plate 40 can be rotated manually by the user, or the traveller plate 40 could be rotated by the use of a dial or other actuator. This allows the start position of the traveller 30 along the helical path 42 to be set by the user. Alternatively, the traveller 30 can be rotated around the helical path 42 relative to the traveller plate 40.

As soon as the tension or force holding the stopper 54 in the raised (disengaged) position is removed, the biasing members 58 urge the stopper 54 into the lowered (engaged) position away from the stopper base 51, as shown in FIG. 7B. In this configuration, one of the radial locking spokes 43 of the locking plate 40 abuts the stopper 54 thereby preventing the locking plate 40 from rotating with the carrier plate 20 and the pawl carrier 3.

In this embodiment or aspect, the stopper 54 is only moved into the disengaged position in order to set the length of safety line that can be paid out from the device as, without relative rotation between the traveller plate 40 and the carrier plate 20, there would be no movement of the traveller 30 along the radial channel 22.

It will be appreciated that a variety of locking devices could be provided in order to lock the stopper 54 in the engaged position and prevent the locking plate 40 from rotating. For example, the circumference of the locking plate 40 could comprise a plurality of holes configured to align with a moveable pin or lock provided on the stopper 54.

In some non-limiting embodiments or aspects, the start position of the traveller 30 along the helical path 42 may not be adjustable during use of the device 10. For example, the start position of the traveller 30 may be set during assembly of the device to the length required for a particular worksite. It may be preferable that this setting cannot be adjusted (without removing the device housing/disassembling the device) to prevent any accidental adjustment of the traveller 30 position during use of the device.

Additionally or alternatively, a catch or other locking mechanism may be provided to prevent any accidental rotation of the traveller plate 40.

Figure 8:
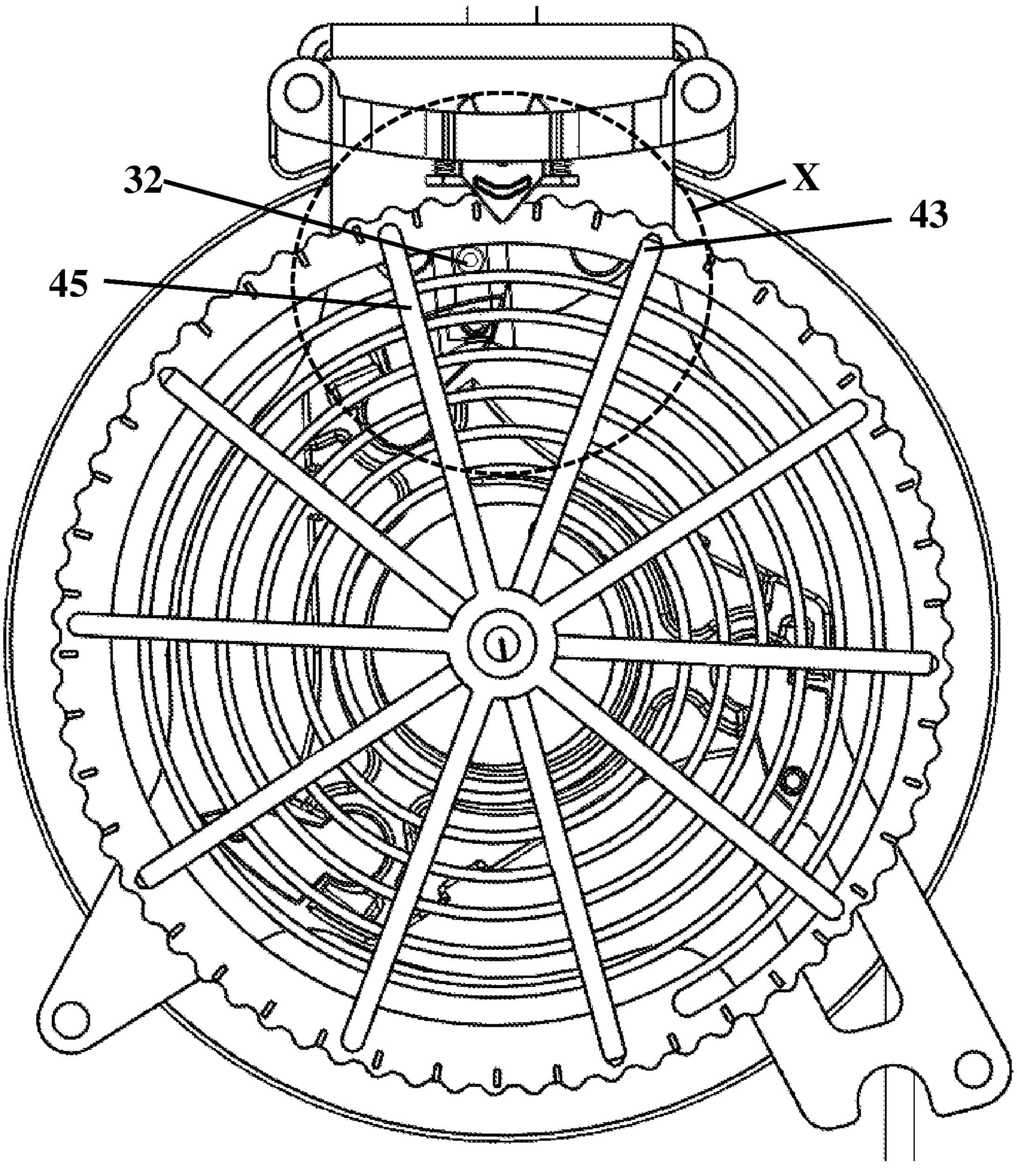
FIG. 8 shows a front view of the fall arrest device and settable length apparatus of FIG. 6 in a locked configuration.
Figure 9:
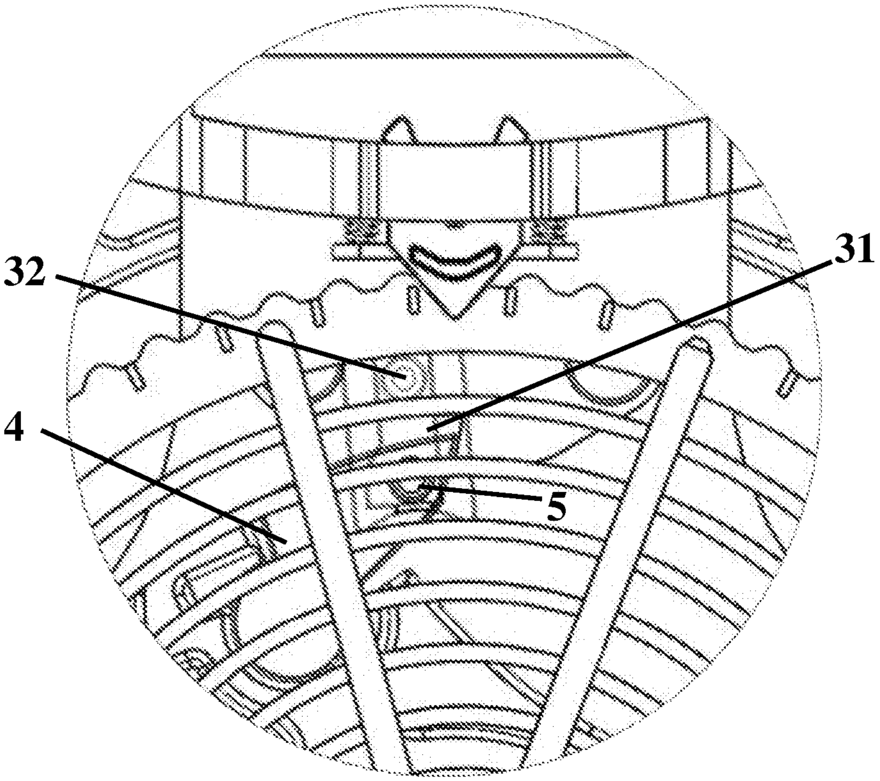
FIG. 9 is a close up of area X in FIG. 9 showing the position of the traveller and pawl in the locked configuration.

FIG. 8 shows the fall arrest device and settable length apparatus of FIG. 6 in the locked configuration as the predetermined length of the safety line 2 has been paid out. As shown, the projection 32 of the traveller has moved along the helical path 42 of the traveller plate until it has reached the outer circumferential portion of the path proximate the pawl stop formation 6. The area X of FIG. 8 is shown in close-up in FIG. 9. One of the locking spokes 43 would abut the stopper 54 in the position shown in FIG. 6 in order to prevent rotation of the traveller plate 40, however, this is shown in a rotated position as it would otherwise block the position of the traveller pin 32 and pawl 4.

In this locked position, the projection 5 of a pawl 4 of the speed responsive engagement assembly is received in the slot 31 on the back of the traveller 30. The movement of the traveller along the radial channel 22 pulls (or pushes) the pawl 4 into engagement with the pawl stop formation 6, locking the pawl carrier as if a fall arrest event has occurred. This prevents further safety line from being paid out, thereby restraining the user. Until a fall arrest event does occur, there should be no further torque that results in deployment of the energy absorber device.

For example, if the fall arrest device 10 is being used by workers on a roof site, wherein the edge of the roof is 5 m from where the fall arrest device 10 is mounted, the initial position of the traveller 30 can be set to allow just less than 5 m (e.g. 4.5 m) of safety line to be paid out from the device 10. This prevents the user from falling off the edge of the roof, as the safety line 2 locks before the user reaches the edge of the roof. In the event that the user did fall off the roof edge, for example if the initial position of the traveller 30 was not set correctly, then the speed responsive engagement assembly and energy absorber would arrest the descent of the user in the usual manner to reduce the risk of injury.

Figure 10:
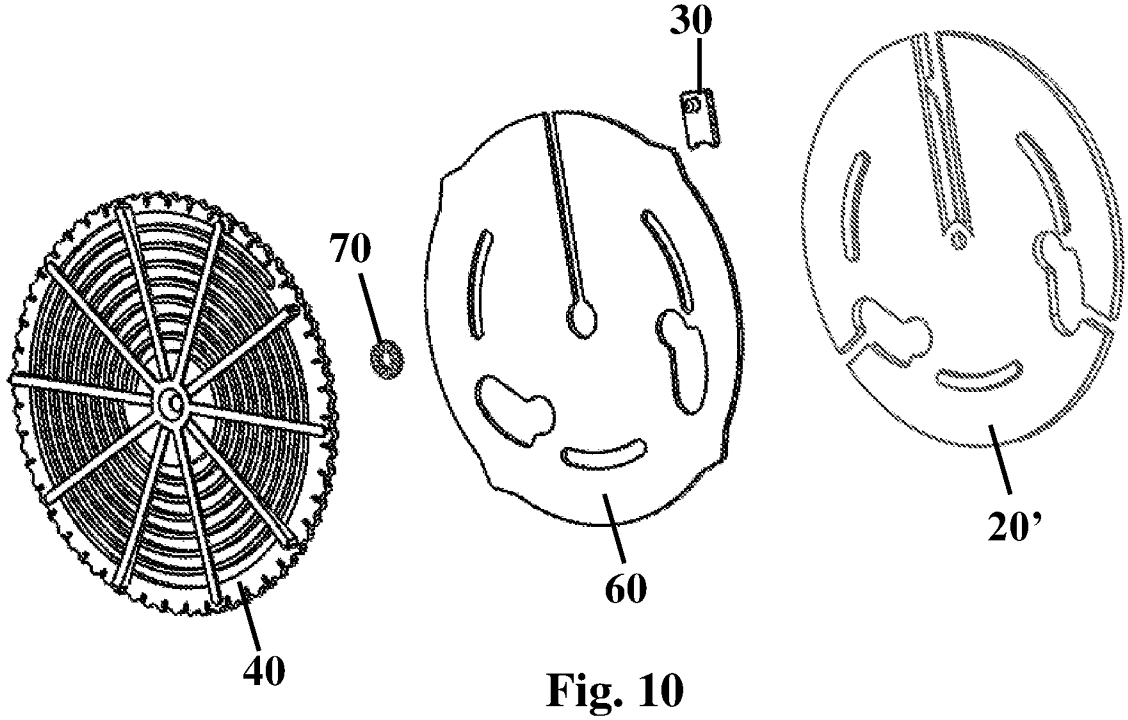
FIG. 10 is an exploded view of a settable length apparatus according to some non-limiting embodiments or aspects of the present disclosure.

FIG. 10 shows an exploded view of another non-limiting embodiment or aspect of the settable length apparatus of the present disclosure. The traveller plate 40 and traveller 30 are the same as in FIG. 1 (there is also no change to the stop assembly 50). However, a different carrier plate 20' is provided and an offset plate 60 is located between the traveller plate 40 and the traveller 30. A bearing 70, preferably a ball bearing 70, mounts the traveller plate 40 to the offset plate 60 and allows for smooth relative rotation between the traveller plate 40 and the offset plate 60.

Figure 11:
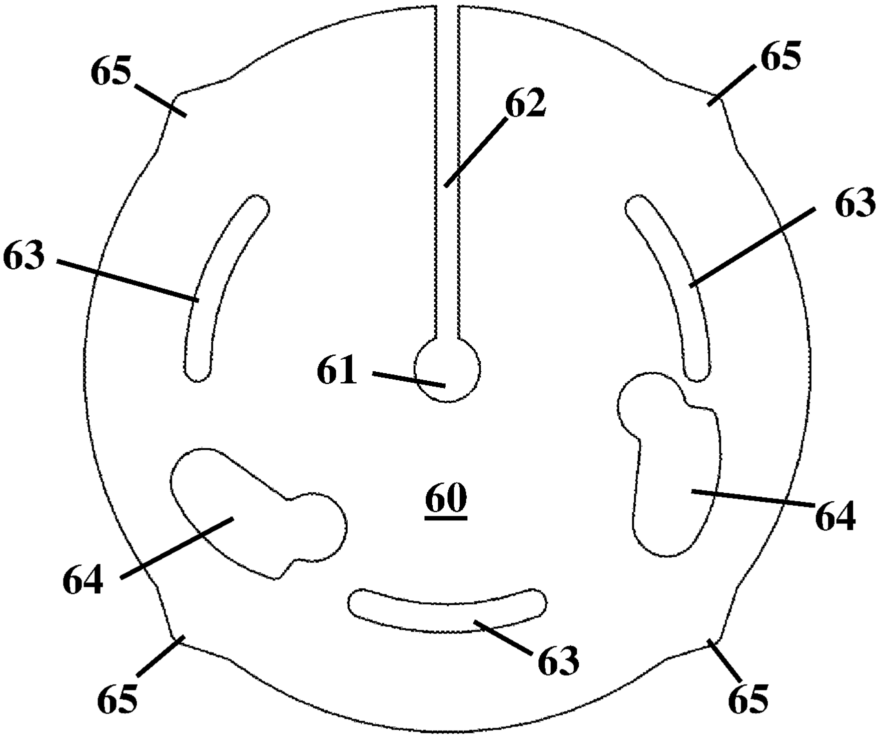
FIG. 11 is a front view of the intermediate offset plate in FIG. 10.

The offset plate 60 is shown in more detail in FIG. 11. The offset plate 60 includes a central aperture 61 for receiving the bolt which mounts the plates 40, 60, 20' to the pawl carrier 3 therethrough. A radial channel 62 intersects the central aperture 61 and extends to the circumference of the offset plate 60. The offset plate 60 further includes a pair of pawl openings 64 arranged to receive two of the pawls 4 therethrough. This allows the two pawls 4 to be inspected and ensures that the offset plate 60 is correctly aligned. The pawl 4 that is not received in one of the pawl openings 64 is the one that engages the slot 31 of the traveller 30.

The offset plate 60 also comprises three circumferential openings 63. During assembly, the openings 63 are aligned with the corresponding projections 23' on the carrier plate (see FIGS. 12A, 12B). Thus, the offset plate 60 clicks or snap-fits into place when mounted to the carrier plate 20'. This ensures that the offset plate 60 and the carrier plate 20' are correctly aligned and rotate together at the same rate.

It will be appreciated that the offset plate 60 could include one or more projections instead of or in addition to openings 63, wherein each projection is arranged to mate with a corresponding opening in the carrier plate.

The offset plate 60 is provided to offset the rotation of the traveller plate 40 from the rotation of the drum 1, pawl carrier 3 and carrier plate 20'. This allows a longer maximum permitted length of safety line 2 to be paid out without increasing the length of the helical path 42. This is done using the push formations 65 provided on the circumference of the offset plate 60 (described below).

Figure 12A:
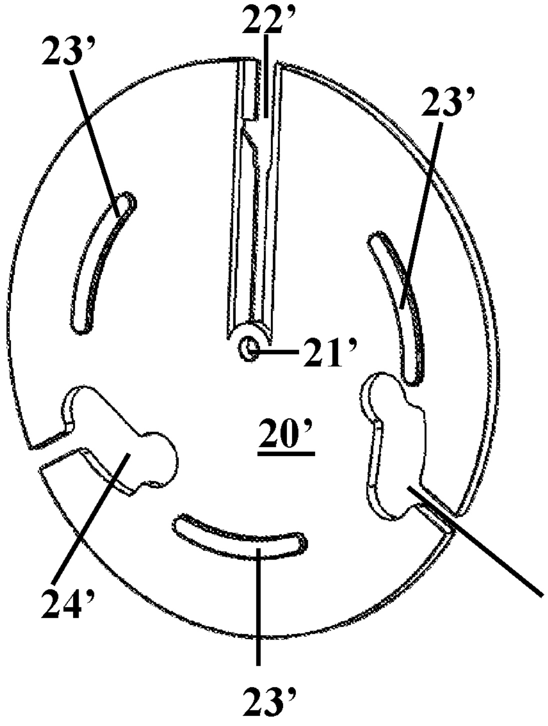
FIG. 12A is a front perspective view of the carrier plate in FIG. 10.
Figure 12B:
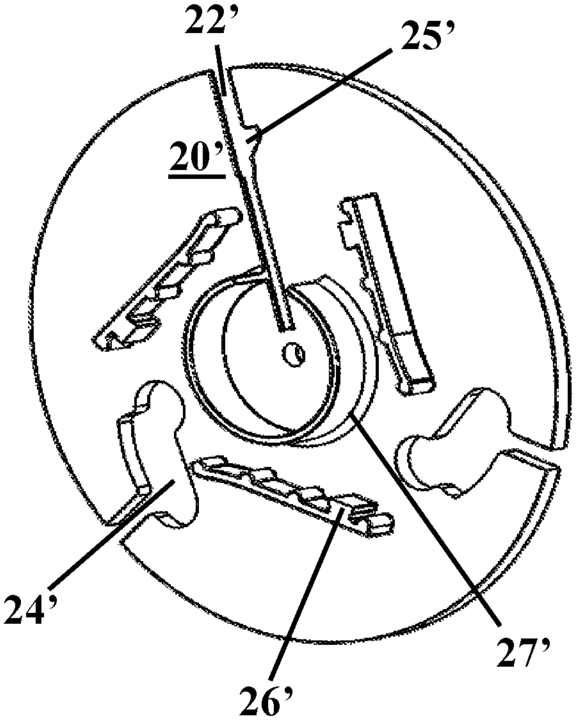
FIG. 12B is a rear perspective view of the carrier plate in FIG. 12A.

As shown in FIGS. 12A and 12B, the carrier plate 20' is similar to the carrier plate 20 in FIG. 1, and so common features are numbered accordingly. It additionally comprises pawl openings 24' configured to align with openings 64 in the offset plate, and projections 23' configured to mate with circumferential openings 63 in the offset plate 60 as described above.

The guide 22' includes a radial channel, but it is not a straight linear channel as in carrier plate 20. The radial channel 22' includes a recess 25'. The recess 25' is shaped to assist the pawl 4 to engage the pawl stop formation 6 (i.e. move to the activated position) without hitting the sides of the channel 22'. It will be appreciated that channel 20 could also include the recess 25'.

The back of the carrier plate 20' comprises flange 27' surrounding the central aperture 21' configured to key the carrier plate 20' to the pawl carrier 3. The flange 27' is preferably configured to allow the carrier plate 20' to only be mounted to the pawl carrier 3 in a particular orientation. In addition, ribs 26' are provided on the rear face of projections 23' in the carrier plate 20'. The ribs 26' are configured to abut or engage the pawl carrier 3.

Figure 13:
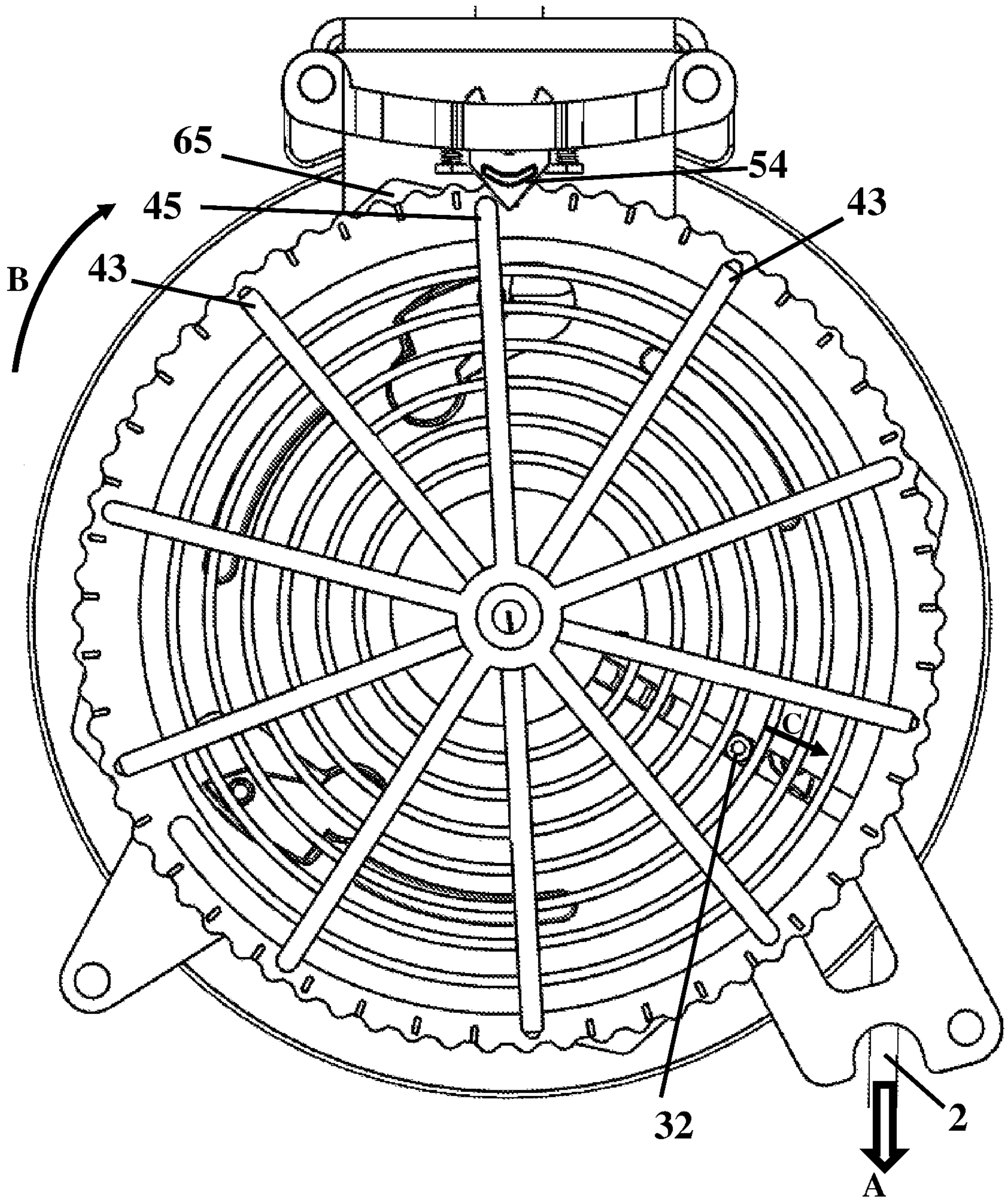
FIG. 13 shows a front view of a fall arrest device comprising the settable length apparatus of FIG. 10.

FIG. 13 shows a front view of the fall arrest device 10 including the settable length apparatus of FIG. 10. The push formations 65 are spaced from the stopper 54 and stopper 54 is in the engaged position. One of the non-locking spokes 45 (or flat spokes 45) is positioned proximate the stopper 54, but this does not prevent the traveller plate 40 from rotating with the pawl carrier 3, offset plate 60' and carrier plate 20'.

The initial position of the traveller 30 and traveller projection 32 along the helical path 42 is adjusted as described in connection with FIGS. 7A and 7B.

When the safety line 2 is paid out in direction A during normal operation, in the position shown in FIG. 13, the drum 1, traveller plate 40, offset plate 60 and carrier plate 20' all rotate together in direction B. There is no movement of the traveller 30 along the helical path 42 or the radial channel 22', as there is no relative rotation between the traveller plate 40 and the carrier plate 20'.

When one of the locking spokes 43 engages the stopper 54, the stopper 54 holds the traveller plate 40 in a fixed position. This allows the traveller projection 32 to move along the helical path 42 causing the traveller 30 to slide radially outwards along channel 22' in the carrier plate 20' in the direction shown by arrow C. This motion continues until one of the push formations 65 engages the stopper 54, as shown in FIGS. 14A to 14C.

Figure 14A:
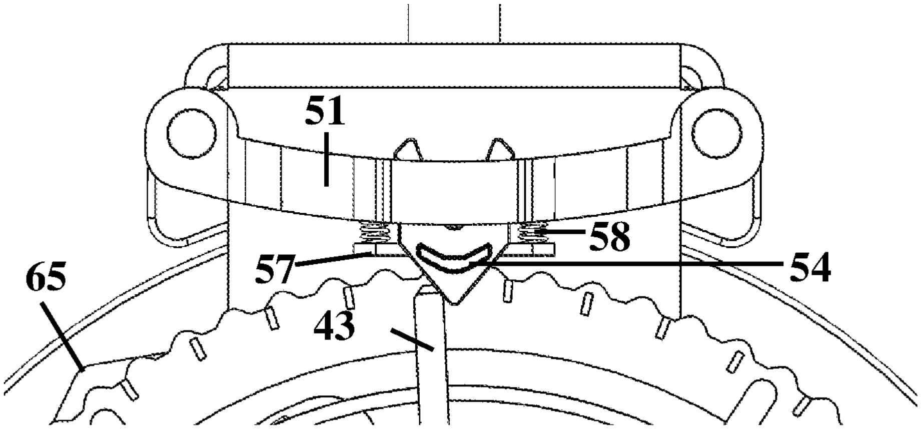
FIG. 14A shows the stopping mechanism of the apparatus in FIG. 13 in a first engaged configuration.

In FIG. 14A, the stopper is in the engaged position. One of the locking spokes 43 on the traveller plate 40 abuts the point 55A of the stopper 54 to prevent the traveller plate 40 from rotating with the drum 1 (as in FIG. 13).

Figure 14B:
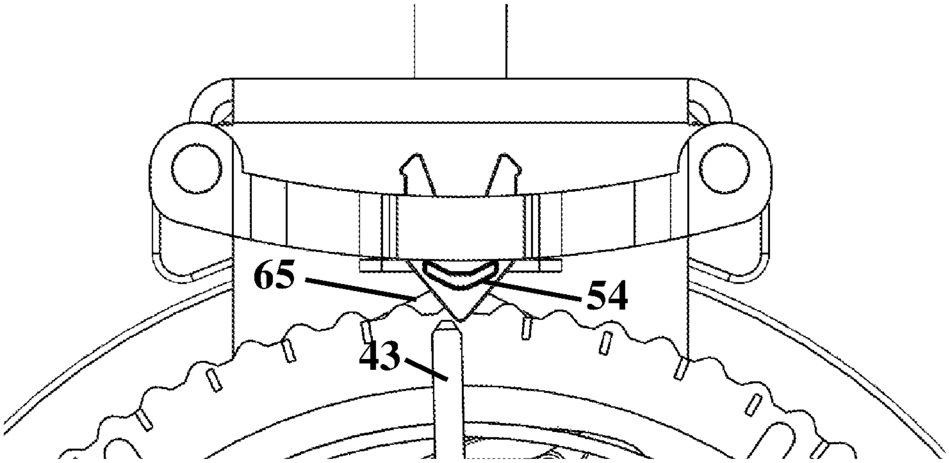
FIG. 14B shows the stopping mechanism of the apparatus in FIG. 14A in a disengaged configuration.

In FIG. 14B, the offset plate 65 has rotated relative to the stopper 54 until one of the push formations 65 engages the stopper 54 and raises it into the disengaged position against the force of the biasing members 58. This allows the traveller plate 40 to rotate with the drum 1, offset plate 60 and carrier plate 20' at the same rate as the drum 1 until the push formation 65 rotates out of engagement with the stopper 54, as shown in FIG. 14C. In this condition there is no movement of the traveller 30 along the helical path 42 or along the radial channel 22', as there is no relative rotation between the traveller 30 and the traveller plate 40.

Figure 14C:
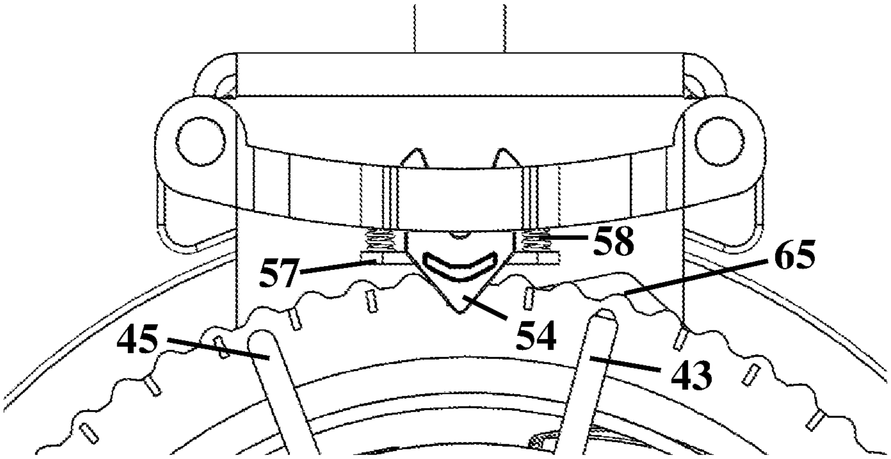
FIG. 14C shows the stopping mechanism of FIGS. 14A and 14B in a second engaged configuration.

In FIG. 14C, the push formation 65 is no longer raising the stopper 54 and so the biasing members 58 urge the stopper 54 downwards into the engaged position. The flat (non-locking) spokes 45 do not abut the stopper 54. When the next locking spoke 43 on the traveller plate 40 abuts the stopper 54 the traveller plate 40 will be fixed again, preventing rotation. This allows the traveller 30 to move along the helical path 42 and radially along the channel 22'.

In the examples shown, the traveller plate 40 includes five radial locking spokes 43 evenly spaced around the traveller plate 40. The offset plate 60 includes four push formation 65. This means that the traveller plate 40 is offset by 30° five times for every full revolution of the traveller plate 40. In other words, in a full revolution (360°) of the traveller plate 40, the drum 1, offset plate 60 and carrier plate 20' will each have rotated 510°. This can be altered by adjusting the number and spacing of the push formations 65 and the spokes 43.

In FIG. 13, if the force in direction A pulling (or tensioning) the safety line 2 is removed, then the drum 1 will rotate in the direction opposite to arrow B (anticlockwise) to retract the safety line 2 onto the drum 1. The carrier plate 20' and offset plate 60 will rotate with the drum 1. The rotation of the traveller plate 40 will be as described above in relation to FIGS. 14A to 14C, but anticlockwise as opposed to clockwise. When the stopper 54 holds the traveller plate 40 in a fixed position the traveller 30 will travel back along the helical path 42 towards the start position 42A, resulting in the traveller 30 sliding radially inwards along channel 22 in the opposite direction to arrow C.

Figure 15:
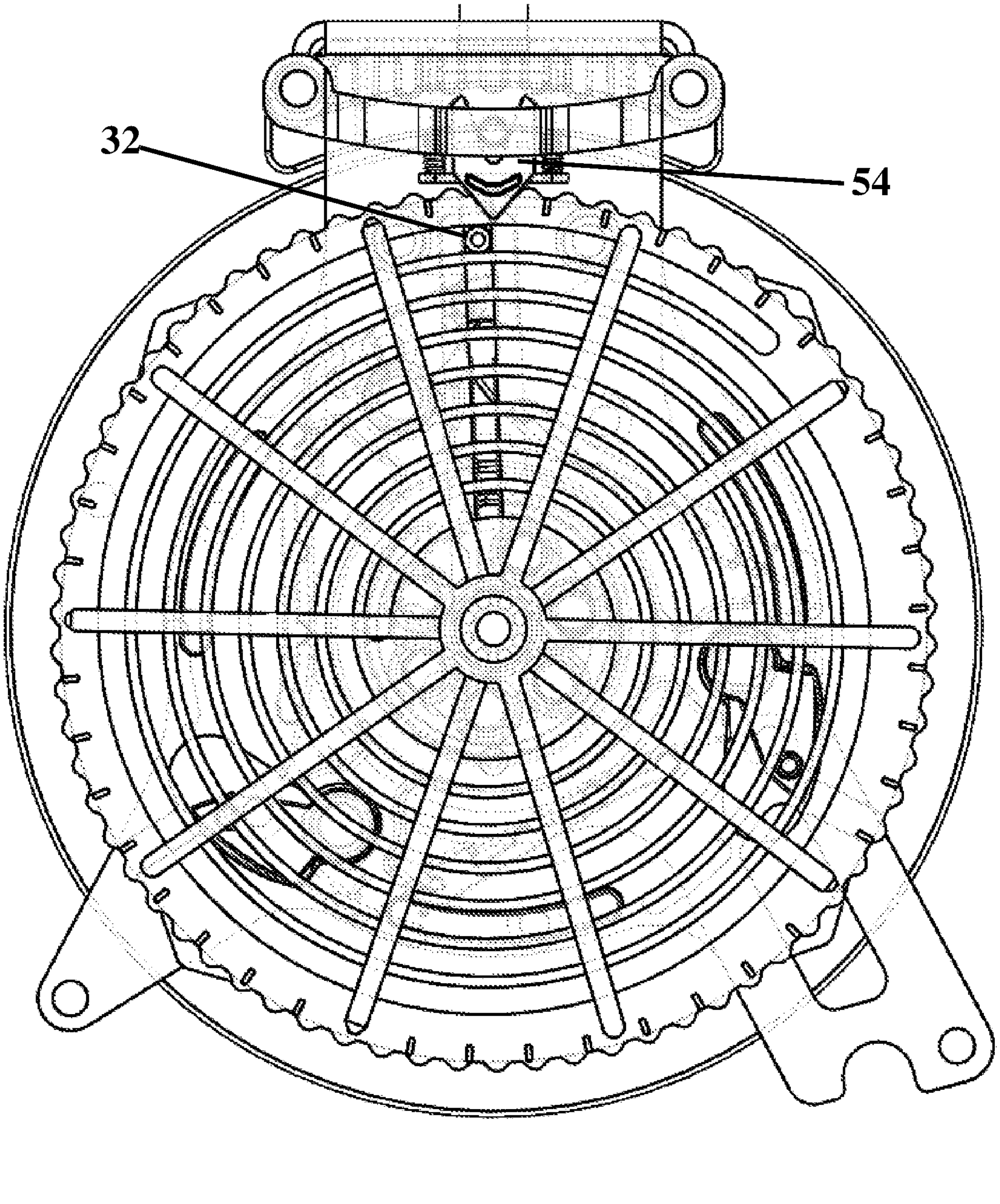
FIG. 15 shows a front view of the fall arrest device and settable length apparatus of FIG. 13 in a locked configuration.

As shown in FIG. 15, the stopper 54 is in the engaged position and the traveller 32, 30 has moved along the helical path 42 in the traveller plate 40 and radially outwards along the channel 22' until it has pulled (or pushed) a pawl 4 into engagement with the pawl stop formation 6. As explained above in connection with FIGS. 8 and 9, the projection 5 of the pawl 4 is received in the slot 31 of the traveller 30 and the movement of the traveller 30 pushes or pulls the pawl 4 into the engaged position as if a fall arrest event had occurred. This locks the drum 1 and prevents further safety line from being paid out.

It will be appreciated that, in order to increase the maximum length of safety line that could be paid out from the fall arrest device 10, the length of the helical path 42 could be increased. This would either increase the size of the traveller plate 40 required or decrease the spacing between segments of the helical path 42. A larger traveller plate 40 would be inconvenient and increase costs, as it would not fit within the housing of the fall arrest device 10. Likewise, decreasing the spacing between segments of the helical path 42 would likely result in a fragile traveller plate.

In FIGS. 1 to 15 the traveller is configured to move outwards (or radially outwards) in response to rotation of the drum to pay out safety line. However, in some non-limiting embodiments or aspects, the traveller may be configured to move inwards in response to rotation of the drum to pay out safety line.

Figure 16:
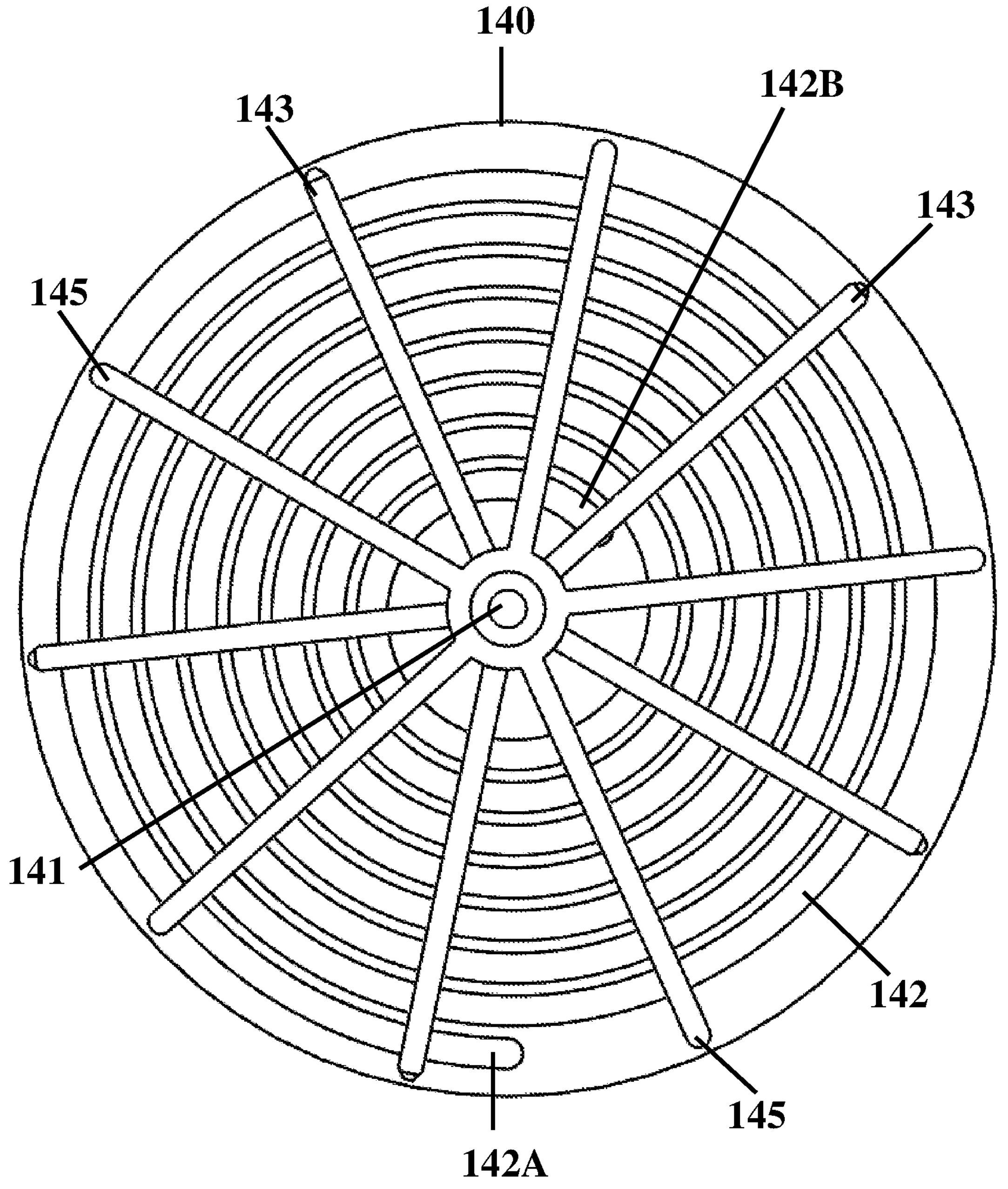
FIG. 16 shows a front view of another embodiment of a traveller plate according to some non-limiting embodiments or aspects of the present disclosure.

FIG. 16 shows a front view of another non-limiting embodiment or aspect of a traveller plate 140. The traveller plate 140 includes a plurality of radial locking spokes 143 and non-locking spokes 145 mounted to the front of the traveller plate 140. Spokes 143 and 145 are equivalent to spokes 43 and 45 shown in FIG. 1. The traveller plate 140 includes a central aperture 141 for receiving a bolt therethrough. The circumference of the traveller plate 140 is smooth.

The direction of the helical path 142 has been reversed compared to helical path 42 in the previous figures. The helical path 142 extends inwards from the circumference in a clockwise direction, rather than an anticlockwise direction as in FIG. 6. The start point 142A of the helical path is located proximate the circumference of the traveller plate 140. The end point 142B of the helical path is located proximate to the center 141 of the traveller plate 140.

As such, when the traveller plate 140 is held in a fixed position relative to the carrier plate 20, 20', the traveller will move inwards along the helical path 142 towards the central aperture 141.

Figure 17:
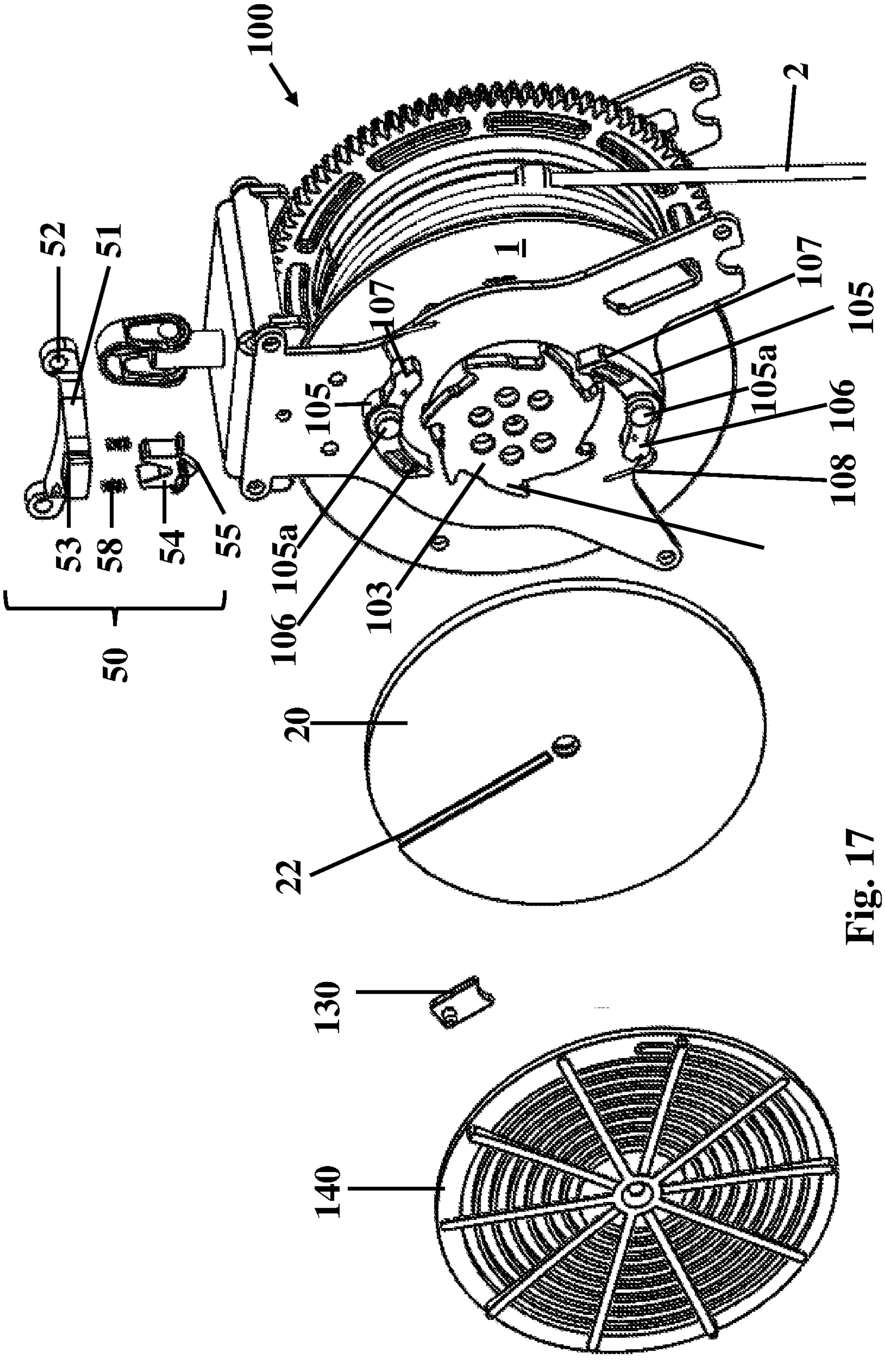
FIG. 17 is an exploded view of a settable length apparatus comprising the traveller plate in FIG. 16 together with a fall arrest device.

The traveller plate 140 may be used with a self-retracting lifeline device 100 of the type described in WO2008/007119, as shown in FIG. 17. Common features between the apparatus in FIG. 1 and the apparatus in FIG. 17 have been given the same reference numeral.

Figure 18:
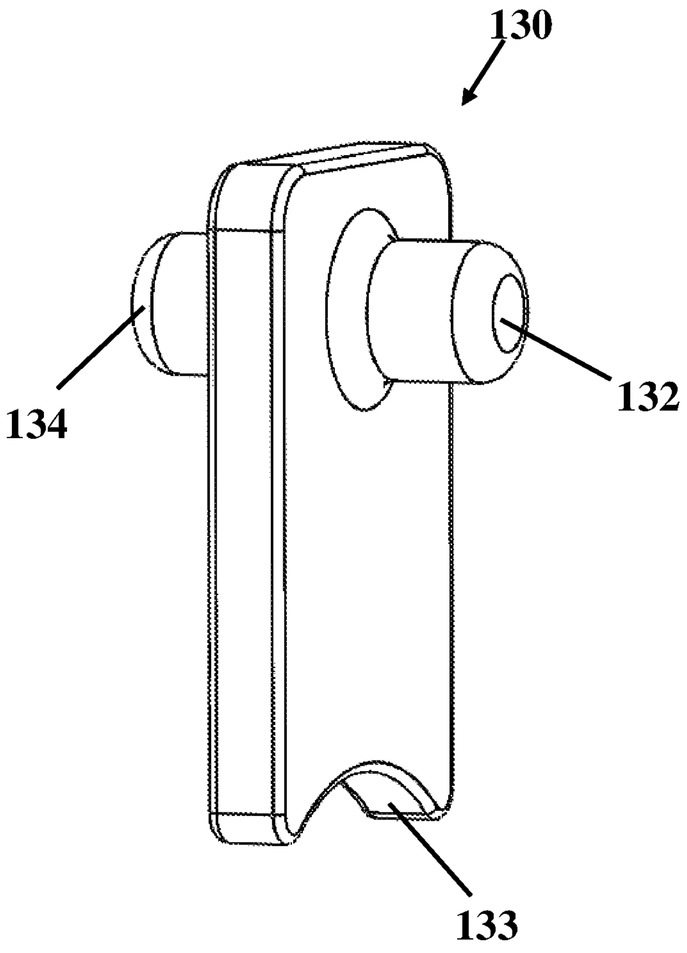
FIG. 18 is a side perspective view of the traveller in FIG. 17.

As shown in FIG. 18, the settable length (or restraint) apparatus includes the traveller plate 140, a traveller 130, a carrier plate 20 and the stop assembly 50.

The carrier plate 20 may be the same as in FIG. 1. In some non-limiting embodiments or aspects, the guide 22 may include a channel which may be shaped slightly differently. For example, the channel may be longer, it may not be linear and/or it may not be radial. It will be appreciated that the carrier plate 20' and the offset plate 60 could be provided in the apparatus of FIG. 17 instead of carrier plate 20.

The traveller 130 is shown in more detail in FIG. 18. As in previous embodiments or aspects, the traveller 130 includes a front projection or peg 132 and the base 133 of the traveller 130 is curved to allow the traveller 130 to slide closer to the central aperture of the carrier plate. However, instead of a slot 31, the rear of the traveller 130 includes a second (or rear) projection 134. The rear projection 134 is configured to abut or contact a pawl 105 of the speed responsive engagement assembly. The rear projection 134 is not necessarily aligned with the front projection 132 as shown in FIG. 18.

The fall arrest device 100 includes a different speed responsive engagement assembly compared to the fall arrest device 10 in FIG. 1. As shown in FIG. 17, the speed responsive engagement assembly includes a locking disc or ratchet wheel 103 mounted to rotate with the drum 1. The ratchet wheel 103 includes a plurality of teeth 104. Two pawls 105 are pivotally mounted to the chassis or housing of the fall arrest device 100. The pawls 105 do not rotate with the drum 1.

Each pawl 105 has a first end 106 and a second end 107. The pivot point 105*a* of the pawls is located between the first end 106 and the second end 107, such that when the second end 107 tilts towards the ratchet wheel 103 the first end 106 tilts away from the ratchet wheel 103.

The pawls 105 can be pivoted (about pivot point 105*a*) between a disengaged position and an engaged position. In the disengaged position, the ratchet wheel 103 can rotate past the pawls 105. In the engaged position, the first end 106 of each pawl 105 engages with a tooth 104 of the ratchet wheel 103, thereby locking the ratchet wheel 103.

A leaf spring 108 urges the second end 107 of each pawl downwards, so that the pawl is in the disengaged position. The operation of the speed responsive engagement assembly is described in detail in WO2008/007119.

In this non-limiting embodiment or aspect, when the safety line 2 is paid out from the drum 1 and the stopper 54 holds the traveller plate 140 in a fixed position, the traveller 130 moves inwards along the helical path 142. This moves the traveller 130 inwards along the guide 122 of the carrier plate towards the rotational axis of the drum 1. After a predetermined length of safety line 2 has been paid out, the rear projection 134 of traveller 130 is arranged to contact the first end 106 of the pawl and push the first end 106 downwards into the engaged position with one of the teeth 104 of the ratchet wheel 103. Moving the start position of the traveller 130 closer to the start point 142A of the helical path 142, increases the predetermined length of safety 2 that can be paid out of the device 100 before the traveller 130 locks the speed responsive engagement assembly.

The start position of the traveller 130 can be adjusted by manually rotating the traveller plate 140 relative to the carrier plate 20, with the stopper 54 in the disengaged position. In some non-limiting embodiments or aspects, as explained above, an actuator may be provided to rotate the traveller plate 140.

It will be appreciated that the fall arrest device 100 could also be used with the restraint (settable length) apparatus shown in FIG. 1 or FIG. 10, with the traveller 130 configured to move outwards in response to rotation of the drum 1 to pay out safety line 2. In this embodiment or aspect, the traveller 130 is configured to push (or pull) the second end 107 of one of the pawls 105 upwards against the biasing force of the leaf spring 108 to move the first end 106 of the pawl into the engaged position with the ratchet wheel 103.

It will also be appreciated that the traveller 30, 130 may be any type of actuator configured to move in response to rotation of the drum 1 and to activate the speed responsive engagement assembly when a predetermined length of safety line has been paid out. The traveller plate, carrier plate and offset plate need not be provided. The non-limiting embodiments or aspects of the present disclosure have been described in detail herein. However, it will be appreciated by those skilled in the art that various modifications and alternatives to the embodiments or aspects may be made without departing from the concepts disclosed in the foregoing description. Such modifications are to be considered as included within the following claims unless the claims, by their language, expressly state otherwise. Accordingly, the particular embodiments or aspects described in detail hereinabove are illustrative only and are not limiting as to the scope of the disclosure, which is to be given the full breadth of the appended claims and any and all equivalents thereof.

The invention claimed is:

1. A fall arrest device comprising:

a drum configured to have a safety line wound thereon;

a speed responsive engagement assembly arranged to inhibit rotation of the drum above a predetermined rotational speed; and a traveller configured to move transversely to a rotational axis of the drum in response to rotation of the drum, wherein the traveller is configured to activate the speed responsive engagement assembly when a predetermined length of safety line has been paid out.

2. The fall arrest device of claim 1, wherein the traveller is configured to move inwards, or radially inwards, in response to the rotation of the drum to pay out safety line.

3. The fall arrest device of claim 1, wherein the traveller is moveable between a start position and an end position, wherein the end position is arranged such that the traveller engages a component of the speed responsive engagement assembly.

4. The fall arrest device of claim 3, wherein the start position of the traveller can be adjusted to set the predetermined length of safety line.

5. The fall arrest device of claim 4, wherein the speed responsive engagement assembly comprises a plurality of pawls pivotally mounted on a pawl carrier and the pawl carrier is mounted to rotate with the drum; or wherein the pawl stop formation is a ratchet wheel mounted to rotate with the drum and the pawl is mounted to a chassis or a housing of the fall arrest device.

6. The fall arrest device of claim 3, wherein the speed responsive engagement assembly comprises a pawl and a pawl stop formation and, in the end position, the traveller is configured to move the pawl into engagement with the pawl stop formation.

7. The fall arrest device of claim 1, wherein the fall arrest device is a self-retracting lifeline (SRL) device.

8. The fall arrest device of claim 1, wherein the traveller is not load bearing.

9. An apparatus for setting the length of safety line that can be paid out from a fall arrest device, the fall arrest device comprising a drum onto which the safety line is wound, wherein the apparatus comprises:

a traveller plate having a curved path that extends outwards towards the circumference of the traveller plate;

a carrier plate comprising a guide; and a traveller configured to be moveably mounted to or within the guide, wherein a portion of the traveller is arranged to be received in the curved path of the traveller plate, and wherein, in response to rotation of the drum to pay out safety line, the traveller moves along the curved path of the traveller plate and is urged along the guide of the carrier plate.

10. A fall arrest device comprising:

a drum configured to have a safety line wound thereon;

a speed responsive engagement assembly configured to inhibit rotation of the drum above a predetermined rotational speed; and a traveller configured to move outwards or radially outwards in response to rotation of the drum and to activate the speed responsive engagement assembly when a predetermined length of safety line has been paid out.

11. A fall arrest device comprising:

a drum configured to have a safety line wound thereon;

a speed responsive engagement assembly configured to inhibit rotation of the drum above a predetermined rotational speed;

a traveller configured to move in response to rotation of the drum and to activate the speed responsive engagement assembly when a predetermined length of safety line has been paid out; and a traveller plate having a curved path that extends outwards towards a circumference of the traveller plate and is configured to receive a portion of the traveller.

12. The fall arrest device of claim 11, wherein the traveller comprises a projection which is seated within the curved path of the traveller plate.

13. The fall arrest device of claim 11, wherein the curved path is a helical path.

14. The fall arrest device of claim 11, further comprising a carrier plate mounted to rotate with the drum, wherein the carrier plate comprises a guide into which a portion of the traveller is received.

15. The fall arrest device of claim 14, wherein the traveller is slidably mounted in or to the guide of the carrier plate;

wherein the guide comprises a radial channel;

wherein the traveller is sandwiched between the traveller plate and the carrier plate;

wherein the traveller plate is rotatable relative to the carrier plate in order to adjust the start position of the traveller along the curved path;

wherein in response to rotation of the drum to pay out safety line, the traveller travels outwards along the curved path in the traveller plate and moves along the guide in the carrier plate in a radially outwards direction;

wherein in response to rotation of the drum to pay out safety line, the traveller travels inwards along the curved path in the traveller plate and moves along the guide in the carrier plate in a radially inwards direction; and wherein the traveller plate is mounted within the fall arrest device such that it does not rotate in response to rotation of the carrier plate or the drum.

16. The fall arrest device of claim 14, wherein the traveller plate is mounted to rotate in response to rotation of the drum to pay out safety line.

17. The fall arrest device of claim 16, further comprising:

a mechanism configured to intermittently arrest rotation of the traveller plate while allowing the carrier plate to rotate relative to the traveller plate;

wherein the mechanism comprises a stopper configured to be moveable between an engaged position and a disengaged position, wherein in the engaged position the stopper is configured to prevent the traveller plate from rotating;

wherein the stopper is biased towards the engaged position by one or more biasing members;

one or more abutment members mounted to the traveller plate, wherein the one or more abutment members are arranged to abut the stopper in the engaged position;

an offset plate mounted between the traveller plate and the carrier plate, wherein the offset plate comprises one or more push formations configured to engage the stopper and move it into the disengaged position, wherein the offset plate comprises a plurality of circumferentially spaced push formations, wherein the offset plate is mounted to the carrier plate.

18. A fall arrest device comprising:

a drum configured to have a safety line wound thereon;

a speed responsive engagement assembly arranged to inhibit rotation of the drum above a predetermined rotational speed;

a traveller configured to move in response to rotation of the drum, wherein the traveller is configured to activate the speed responsive engagement assembly when a predetermined length of safety line has been paid out; and a mechanism configured to intermittently arrest movement of the traveller while allowing the drum to continue to rotate.

* * * * *